US008205033B2

(12) United States Patent
Saeki et al.

(10) Patent No.: US 8,205,033 B2
(45) Date of Patent: Jun. 19, 2012

(54) MEMORY DEVICE, MEMORY MANAGEMENT METHOD, AND PROGRAM

(75) Inventors: Shusuke Saeki, Tokyo (JP); Satoru Iwasaki, Tokyo (JP); Seiya Ichimori, Kanagawa (JP); Hiroki Nagahama, Tokyo (JP); Kazumi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 12/265,324

(22) Filed: Nov. 5, 2008

(65) Prior Publication Data

US 2009/0119450 A1   May 7, 2009

(30) Foreign Application Priority Data

Nov. 6, 2007   (JP) ................................ P2007-288726

(51) Int. Cl.
*G06F 12/00* (2006.01)
*G11C 16/02* (2006.01)

(52) U.S. Cl. ................ 711/103; 711/206; 711/E12.008; 711/E12.059

(58) Field of Classification Search ......................... None
See application file for complete search history.

(56) References Cited

U.S. PATENT DOCUMENTS

| 5,603,001 A * | 2/1997 | Sukegawa et al. ............. 711/103 |
| 6,278,678 B1 * | 8/2001 | Iida ................... 369/83 |
| 7,330,911 B2 * | 2/2008 | Hammitt et al. .................. 710/5 |
| 2005/0073884 A1 * | 4/2005 | Gonzalez et al. ........ 365/185.02 |
| 2005/0144418 A1 * | 6/2005 | Kita ............................... 711/203 |
| 2006/0053246 A1 * | 3/2006 | Lee ................. 711/100 |
| 2006/0059296 A1 | 3/2006 | Meir |
| 2006/0062041 A1 * | 3/2006 | Hiraka .......................... 365/145 |
| 2006/0224818 A1 * | 10/2006 | Stewart ......................... 711/103 |
| 2007/0005928 A1 | 1/2007 | Trika |
| 2007/0038802 A1 | 2/2007 | Tsai |
| 2009/0123048 A1 * | 5/2009 | Leroux et al. ................. 382/131 |

FOREIGN PATENT DOCUMENTS

| EP | 1 939 750 | 7/2008 |
| JP | 2002-32256 | 1/2002 |
| JP | 2003-36209 | 2/2003 |
| JP | 2005-115561 | 4/2005 |
| JP | 2005-174279 | 6/2005 |
| JP | 2005 267676 | 9/2005 |
| JP | 2007 257283 | 10/2007 |
| WO | WO 02/058074 | 7/2002 |

OTHER PUBLICATIONS

European Search Report for Application No. 08253498.3-1229 dated Mar. 3, 2009.

* cited by examiner

*Primary Examiner* — Reginald Bragdon
*Assistant Examiner* — Daniel Bernard
(74) *Attorney, Agent, or Firm* — Finnegan, Henderson, Farabow, Garrett & Dunner, L.L.P.

(57) ABSTRACT

A memory device includes a non-volatile memory which allows data to be written, read, and erased electrically and in which writing and reading are done in units of a page and erasing is done in units of a block including a plurality of pages, and a control section that manages access to the non-volatile memory. The control section performs management of access to the non-volatile memory by performing logical address-physical address translation (logical-physical translation) in translation units (TUs) each being an integer fraction of a size of the block and an integer multiple of a page size.

12 Claims, 20 Drawing Sheets

NAND FLASH IS MADE UP OF BLOCKS AS ERASE UNITS, AND PAGES AS READ UNITS

IT IS OK TO PERFORM WRITING IN ORDER FROM LOWEST-NUMBERED PAGE WITHIN BLOCK

IT IS PROHIBITED TO PERFORM WRITING IN RANDOM ORDER WITHIN BLOCK

REFERENCING OF LOGICAL-PHYSICAL
TRANSLATION TABLE

FIG. 13A
IMMEDIATELY AFTER SCANNING OF BLOCK BLK0

FIG. 13B
IMMEDIATELY AFTER SCANNING OF BLOCK BLK1

FIG. 13C
IMMEDIATELY AFTER SCANNING OF BLOCKS BLK2, 3

(*) BECAUSE PHYSICAL TU3 HAVING SAME LOGICAL TU NUMBER 4 IS NEWER (*) BECAUSE PHYSICAL TU4 HAVING SAME LOGICAL TU NUMBER 1 IS NEWER (*) BECAUSE PHYSICAL TU0 HAVING SAME LOGICAL TU NUMBER 5 IS NEWER

MEMORY DEVICE, MEMORY MANAGEMENT METHOD, AND PROGRAM

CROSS REFERENCES TO RELATED APPLICATIONS

The present invention contains subject matter related to Japanese Patent Application JP 2007-288726 filed in the Japanese Patent Office on Nov. 6, 2007, the entire contents of which are incorporated herein by reference.

BACKGROUND OF THE INVENTION

1. Field of the Invention

The present invention relates to a memory device having a non-volatile memory, a memory management method, and a program which can be applied to, for example, a NAND flash memory.

2. Description of the Related Art

A NAND flash memory allows data to be operated electrically, by "writing", "reading" and "erasing".

For example, since rewriting of bits by "writing" is performed in only one direction from "1" to "0", to write data anew, it is necessary to perform "writing" after setting all bits to "1" once by "erasing".

As shown in FIG. 1, in a NAND flash memory, the minimum unit of writing/reading is a page PG, and the minimum unit of "erasing" is a block BLK as a collection of a plurality of pages.

For example, a page PG includes 512 bytes plus spare 16 bytes, thus 528 bytes or 4224 bits. A block BLK includes 32 pages of PG0 to PG31.

Since the minimum unit of "writing" is several tens of times larger than the minimum unit of "erasing", it is necessary to devise some measure to perform rewriting of a NAND flash in an efficient manner.

As shown in FIG. 2, each page PG of a NAND flash memory is made up of a data area 1 into which data is written, and a spare area 2 into which additional information is written.

Generally, in a NAND flash memory, it is necessary to perform writing to pages PG within a block BLK (including the spare area) in order from the lowest-numbered page as shown in FIG. 3A. That is, in a NAND flash memory, random writing within a block BLK is prohibited.

Also, in a NAND flash memory, unusable blocks called defect blocks exist at the time of shipment, and it is necessary to perform reading/writing from/to the NAND flash memory while avoiding these defect blocks.

A NAND flash memory has the above-mentioned features. In this regard, it is desirable to allow existing file systems and tools to be used as they are, or only after slight modifications, with respect to the NAND flash memory as well.

To this end, it is necessary to allow a NAND flash memory to be used without concern for "erasing" operations or defect blocks.

Accordingly, it is necessary to install a layer for interpreting a request from the using side of the NAND flash memory, for example, a file system, and translating the request into a command for operating the NAND flash memory (logical-physical translation layer).

Various related techniques have been proposed in this regard (see, for example, Japanese Unexamined Patent Application Publication No. 2003-36209 and Japanese Unexamined Patent Application Publication No. 2002-32256).

The non-volatile memory described in Japanese Unexamined Patent Application Publication No. 2003-36209 includes a mechanism for returning to the normal storage state even in the event of a system down during device operation such as a power outage. Also, the unit of logical address-physical address translation (logical-physical translation) in this non-volatile memory is a block size, and the write size is a block size.

Also, in the NAND flash memory described in Japanese Unexamined Patent Application Publication No. 2002-32256, logical-physical translation is done in page units, which allows for more efficient rewriting of data than logical-physical translation in block units.

SUMMARY OF THE INVENTION

While the non-volatile memory described in Japanese Unexamined Patent Application Publication No. 2003-36209 mentioned above includes a mechanism for returning to the normal storage state even in the event of a system down during device operation such as a power outage, the unit of logical-physical translation is limited to the block size, and the write size is limited to the block size.

Therefore, even when rewriting data of a size smaller than a block size, it is necessary to perform writing to the NAND flash memory on a block size basis, which disadvantageously results in a large amount of wasteful data writes.

The NAND flash memory described in Japanese Unexamined Patent Application Publication No. 2002-32256 allows for more efficient rewriting of data than is achieved by logical-physical translation in block units.

However, to meet the constraint placed on the writing order of pages within a block of a NAND flash memory shown in FIGS. 3A and 3B, it is necessary to additionally provide a non-volatile memory or a data area of a NAND flash memory to store management information necessary for logical-physical translation, which disadvantageously adds complexity to the system configuration.

Also, in Japanese Unexamined Patent Application Publication No. 2002-32256, no consideration is given to a mechanism for returning to the normal storage state in the event of a system down during device operation such as a power outage.

It is desirable to provide a memory device, a memory management method, and a program which can achieve more efficient rewriting and improved utilization, and enables a return to a normal storage state even in the event of a system down during writing or erasure at the time of a power outage or the like.

According to an embodiment of the present invention, there is provided a memory device including: a non-volatile memory which allows data to be written, read, and erased electrically and in which writing and reading are done in units of a page and erasing is done in units of a block including a plurality of pages; and a control section that manages access to the non-volatile memory, in which the control section performs management of access to the non-volatile memory by performing logical address-physical address translation (logical-physical translation) in translation units (TUs) each being an integer fraction of a size of the block and an integer multiple of a page size.

Preferably, the control section performs an operation of copying, of contents of a source block, only all physical TUs that are being currently used to a block with unused physical TUs, and erasing the source block to increase unused physical TUs additionally by a number equal to the number of invalid physical TUs included in the source block.

Preferably, the memory device further includes a memory, a physical TU in the non-volatile memory includes a data area and a spare area, and the control section writes management information including a corresponding logical TU number, and a sequential number indicating the write order of each block, into the spare area of the non-volatile memory, builds a logical-physical translation table at startup by scanning the management information in the spare area of the non-volatile memory, stores the logical-physical translation table into the memory, and performs a logical-physical translation process on the basis of the logical-physical translation table on the memory.

Preferably, the control section restores, at the startup, a physical TU state map for managing a physical TU, in parallel with building the logical-physical translation table by scanning the management information in the spare area of the non-volatile memory, and the physical TU state map indicates whether the physical TU is in an unwritten, CLEAN state after an erase operation, an INUSE state in which valid data referenced from the logical-physical translation table is stored, or an INVALID state in which invalid data not referenced from the logical-physical translation table is stored.

Preferably, when writing a logical TU number into the spare area, the control section performs writing to a physical TU within a block having the latest sequential number which is a lowest-numbered, CLEAN physical TU sequential from its last physical TU.

Preferably, if the last physical TU is not CLEAN, the control section randomly selects a block that has not been written yet, advances the sequential number by 1 step, and writes the sequential number into the block.

Preferably, the control section updates the physical TU state map by setting a state of a physical TU previously corresponding to a logical TU to INVALID, and setting a state of a write target physical TU to INUSE, and updates the logical-physical translation table by rewriting to the write target physical TU.

Preferably, if a plurality of physical TUs having the same logical TU number exist upon scanning the management information in the spare area of the non-volatile memory, the control section determines the most recently written physical TU as INUSE, and determines other physical TUs as INVALID.

Preferably, the control section determines whether physical TUs are new or old by a size comparison of sequential numbers if the physical TUs are present in different blocks, and on the basis of physical TU numbers if the physical TUs are present within the same block.

Preferably, when performing a fold operation that is an operation of copying, of contents of a source block, only all physical TUs that are being currently used to a block with unused physical TUs, and erasing the source block to increase unused physical TUs additionally by a number equal to the number of invalid physical TUs included in the source block, the control section reads, with respect to every INUSE TU within a fold target block, data and management information within a physical TU, and performs writing of a logical TU by specifying the read data and a logical TU number, and then erases the fold target block.

Preferably, the control section writes write complete state information, which enables determination as to whether or not writing is complete, into the spare area in addition to the management information, and determines whether or not a power supply cutoff has occurred during writing, by checking the write complete state information at startup with respect to the last written block having the latest sequential number.

Preferably, the control section writes information indicating whether or not the management information is correct into the spare area in addition to the management information, and checks whether or not a value of the management information is correct by checking, at startup, the information indicating whether or not the management information is correct.

According to an embodiment of the present invention, there is provided a memory management method for a memory device having a non-volatile memory which allows data to be written, read, and erased electrically and in which writing and reading are done in units of a page and erasing is done in units of a block including a plurality of pages, including: performing logical address-physical address translation (logical-physical translation) in translation units (TUs) each being an integer fraction of a size of the block and an integer multiple of a page size; and managing access to the non-volatile memory in accordance with a result of the logical-physical translation.

According to an embodiment of the present invention, there is provided a program for causing a computer to execute a management process for a memory device having a non-volatile memory which allows data to be written, read, and erased electrically and in which writing and reading are done in units of a page and erasing is done in units of a block including a plurality of pages, the management process including: performing logical address-physical address translation (logical-physical translation) in translation units (TUs) corresponding to an integer fraction of a size of the block and an integer multiple of a page size; and managing access to the non-volatile memory in accordance with a result of the logical-physical translation.

According to an embodiment of the present invention, the unit of logical-physical translation can be selected from a size not smaller than a page size and not larger than a block size. According to an embodiment of the present invention, by introducing information indicating the writing order of blocks (sequential numbers), management information necessary for logical-physical translation can be contained within the spare area while meeting the constraint placed on the writing order of pages within a non-volatile memory.

According to an embodiment of the present invention, it is possible to achieve more efficient rewriting and improved utilization, and to return to a normal storage state even in the event of a system down during writing or erasure at the time of a power outage or the like.

BRIEF DESCRIPTION OF THE DRAWINGS

FIGS. 13A to 13C are diagrams showing how a logical-physical translation table is built by scanning the management information of the NAND flash memory in FIG. 12 in order from a physical TU0;

DESCRIPTION OF THE PREFERRED EMBODIMENTS

Hereinbelow, an embodiment of the present invention will be described with reference to the attached drawings.

Figure 4:
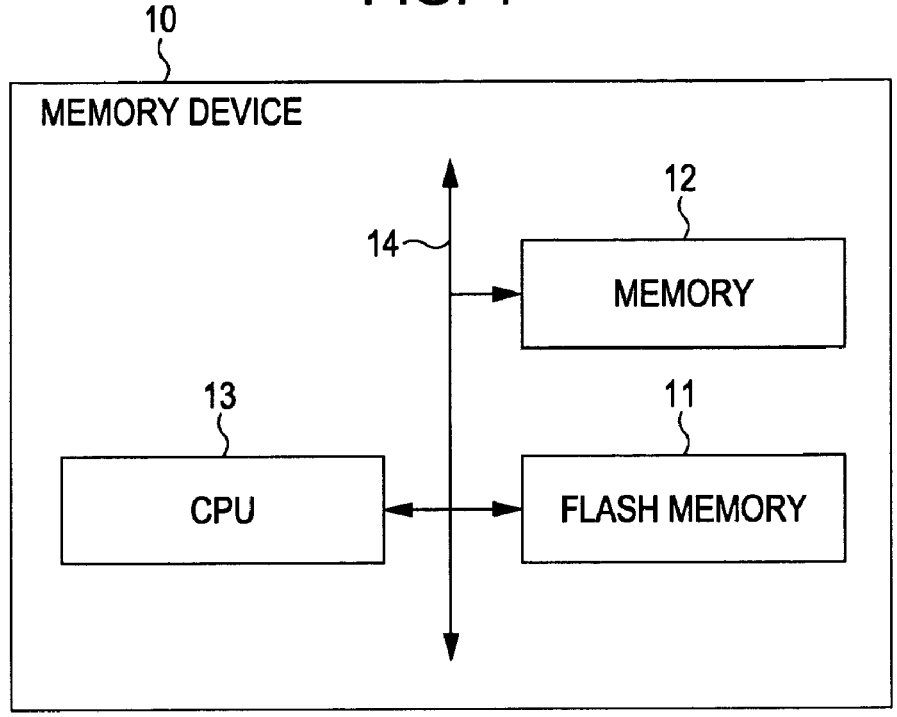
FIG. 4 is a block diagram showing an example of the basic configuration of a memory device according to an embodiment of the present invention.

FIG. 4 is a block diagram showing an example of the basic configuration of a memory device according to an embodiment of the present invention.

A memory device 10 according to this embodiment has a NAND flash memory 11 as a non-volatile memory, a memory 12 configured by, for example, a volatile memory such as a DRAM or an SRAM, and a CPU 13 as a control section.

The NAND flash memory 11, the memory 12, and the CPU 13 are connected to each other via a bus 14.

The NAND flash memory 11 has a memory cell array in which NAND strings with a plurality of memory cells connected in series are arranged in an arrayed fashion, and allows writing, reading, and erasing to be performed electrically.

The minimum read/write unit of the NAND flash memory 11 is a page PG, and the minimum erase unit is a block BLK as a collection of a plurality of pages.

For example, a page PG includes 512 bytes data area plus 16 bytes spare area, thus 528 bytes or 4224 bits. A block BLK includes 32 pages of PG0 to PG31.

For example, a 2-Gbit chip includes 2048 blocks BLK0 to BLK2047 of 128 KB. Each block includes 64 pages of 2 KB and is 128 KB=2 KB×64.

The management of access to the NAND flash memory 11 is performed in accordance with control of the CPU 13 on the basis of management information, write complete data information, CRC information, or the like written into the spare area, as well as information of a logical-physical translation table (logical address-physical address translation table) or physical translation unit (TU) state map built in the memory 12.

It should be noted here that an access to the NAND flash memory 11 includes a memory access related to various write, read, and erase operations (including control processes corresponding to address translation, garbage collection, wear leveling, and the like).

The memory 12 includes a ROM for program storage, and a RAM as a working memory.

In the memory 12, under the control of the CPU 13, a logical-physical translation table (logical address-physical address translation table) described later in detail, and a physical (TU) state map are built.

The CPU 13 functions as a control section that manages access to the NAND flash memory 11, on the basis of management information, write complete data, CRC information, or the like written into the spare area of the NAND flash memory 11, as well as information of a logical-physical translation table or a physical (TU) state map built in the memory 12.

The CPU 13 manages access to the NAND flash memory by performing logical-physical translation in translation units (TU) each being an integer fraction of a block BLK and an integer multiple of the page size.

The CPU 13 has a function of performing an operation control in which, of the contents of a block, only physical TUs being currently used are all copied to another block with unused physical TUs, and then the source block is erased, thereby increasing unused physical TUs additionally by a number equal to the number of invalid physical TUs included in the source block.

In the following description, this operation is referred to as a fold operation.

Also, by writing corresponding logical TU numbers LTUN, and sequential numbers SQN indicating the writing order of blocks into the spare area of the NAND flash memory 11, at restart, the CPU 13 builds a logical-physical translation table solely from information in the spare area of the NAND flash memory, and stores the logical-physical translation table into the memory 12.

Also, the CPU 13 writes state information indicating the completion of writing, and a CRC of management information in the spare area into the spare area of the NAND flash memory 11, thereby allowing recovery to a normal state from a power supply cutoff during writing to or erasing of the NAND flash memory 11.

Now, a description will be given of an example of the configuration of a physical TU and the data structure of a spare area on the NAND flash memory 11.

Figure 5:
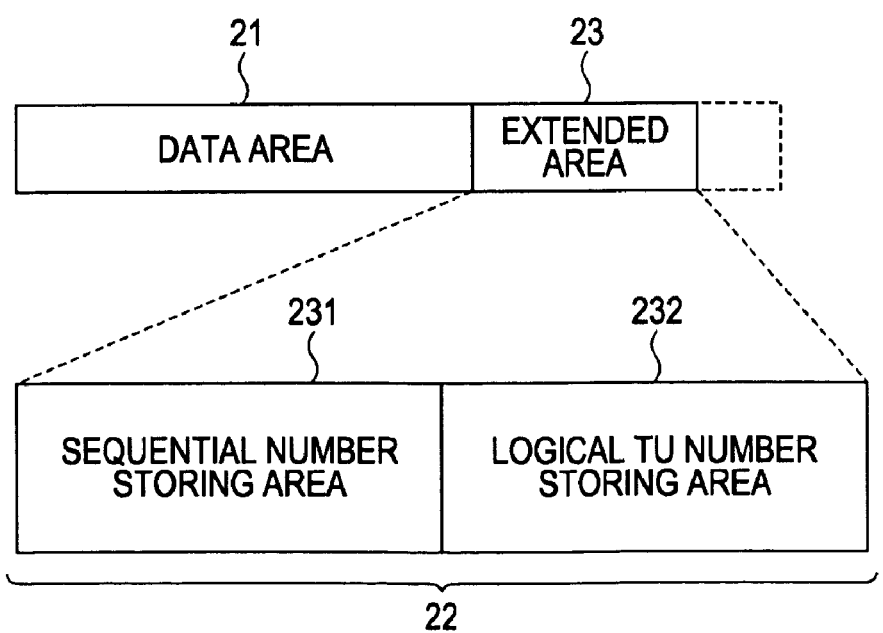
FIG. 5 is a diagram showing an example of the basic configuration of a physical TU and a data structure related to management information stored in a spare area.

FIG. 5 is a diagram showing an example of the basic configuration of a physical TU and a data structure related to management information stored in a spare area.

As shown in FIG. 5, a physical TU is made up of a data area 21 in which normal data is stored, and a spare area 23 in which at least management information 22 of the physical TU is stored.

The management information 22 includes a corresponding logical TU address LTUN, and a sequential number SQN as writing-order information assigned to each block BLK.

Further, the spare area 23 has a sequential number storing area 231, and a logical TU number storing area 232. In some cases, the sequential number storing area 231 and the logical TU number storing area 232 in the spare area 23 are referred to as management area.

As will be described later, in addition to the management information 22, information for determining whether or not writing has been completed in the TU, such as write complete data or a CRC is recorded in the spare area 23.

In this embodiment, a block assigned with the latest sequential number is referred to as the latest block.

Next, the structure of data on the memory 12 will be described.

Figure 6:
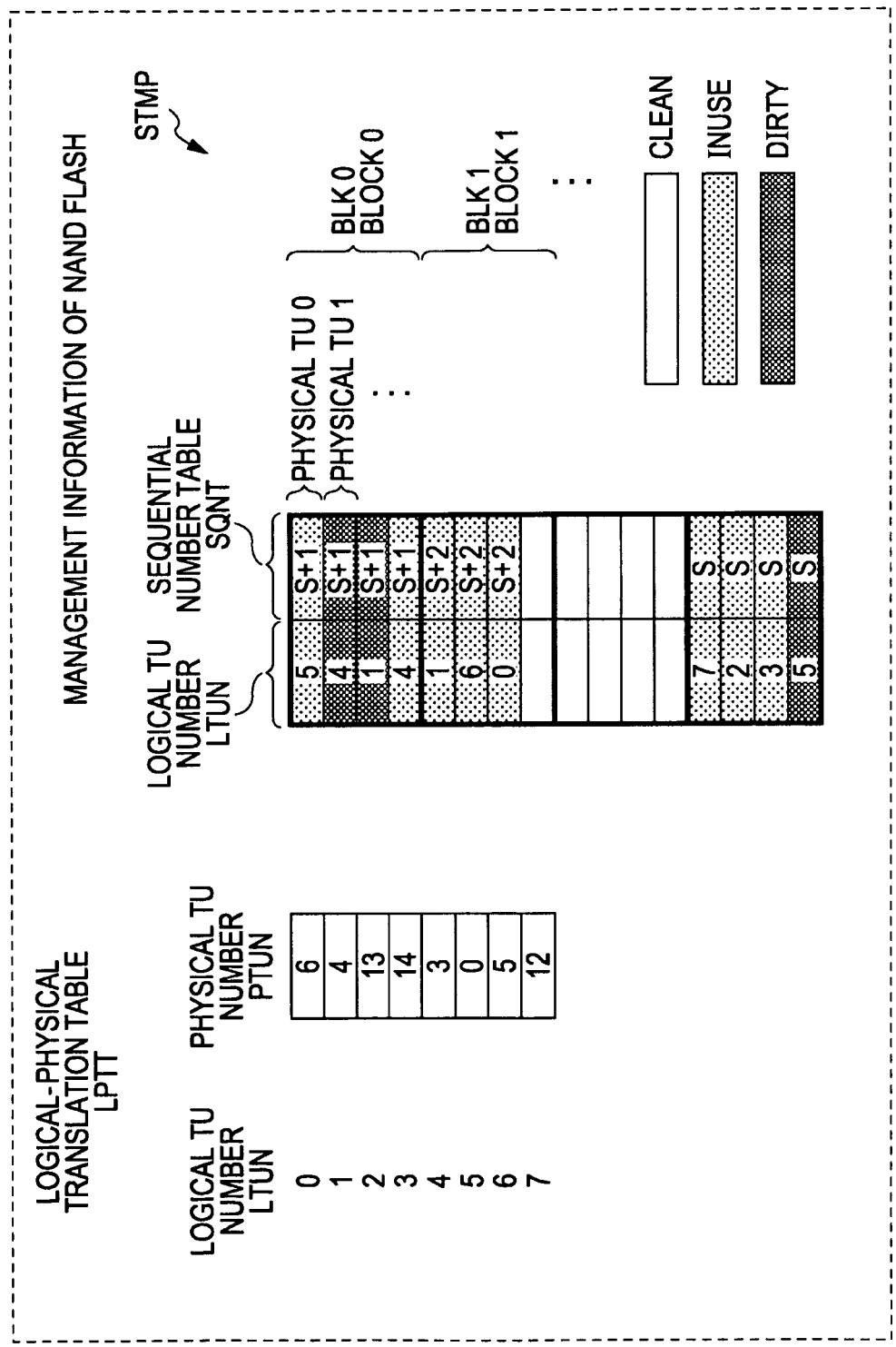
FIG. 6 is a diagram illustrating the structure of data on a memory according to an embodiment of the present invention.

FIG. 6 is a diagram illustrating the structure of data on the memory according to this embodiment. In this example, the structure of data on the memory for managing blocks, logical TUs, and physical TUs will be described.

On the memory 12, a logical-physical translation table LPTT, a physical TU state map STMP, and a sequential number table SQNT are formed.

The logical-physical translation table LPTT is a table used for obtaining a corresponding physical TU number (address) PTUN from a logical TU number (address).

The physical TU state map STMP is a map used for managing the state of each physical TU, and has four kinds of state: CLEAN, INUSE, DIRTY, and DEFECT.

CLEAN represents an unwritten state after an erase operation.

INUSE represents a state in which valid data referenced from the logical-physical translation table LPTT is stored (which can be said to be a valid (VALID) state).

DIRTY represents a state in which invalid data not referenced from the logical-physical translation table LPTT is stored (which can be said to be an invalid (INVALID) state).

DEFECT represents a state in which the physical TU in question exists within a defect block.

The sequential number table SQNT is a table for storing sequential numbers SQN assigned to individual blocks. The sequential number table SQNT is used only at the time of the process of building the logical-physical translation table LPTT.

Hereinbelow, a specific description will be given of the more specific function of the CPU 13 as the control section according to this embodiment, and a control function based on management information or information for determining whether or not writing has been completed.

As described above, the characteristic feature of the CPU 13 according to this embodiment resides in logical-physical translation on a TU (translation unit) basis.

Figure 7:
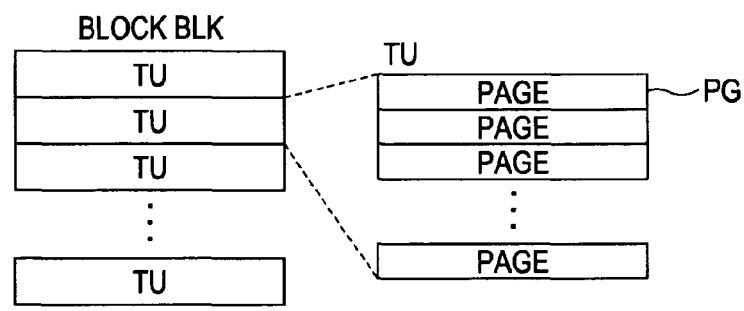
FIG. 7 is a diagram showing the relationship among physical blocks, pages, and TUs of a NAND flash memory.

FIG. 7 is a diagram showing the relationship between physical blocks, pages, and TUs of a NAND flash memory.

The size of a TU is an integer fraction of the block size and an integer multiple of the page size.

The actual TU on a NAND flash memory device is referred to as physical TU, and a TU provided to the using side after undergoing address translation according to an embodiment of the present invention is referred to as logical TU.

This allows for flexible read/write size setting, such as by matching the read/write size with the read/write unit of the file system.

To realize logical-physical translation on a per-TU basis, the CPU 13 uses the logical-physical translation table LPTT that is a table used for obtaining a corresponding physical TU number (address) from a logical TU number (address).

The CPU 13 basically has functions of performing reading of a logical TU, writing of a logical TU, a fold, and building of a logical-physical translation table. These functions will be described below.

<Reading of a Logical TU>

Figure 8:
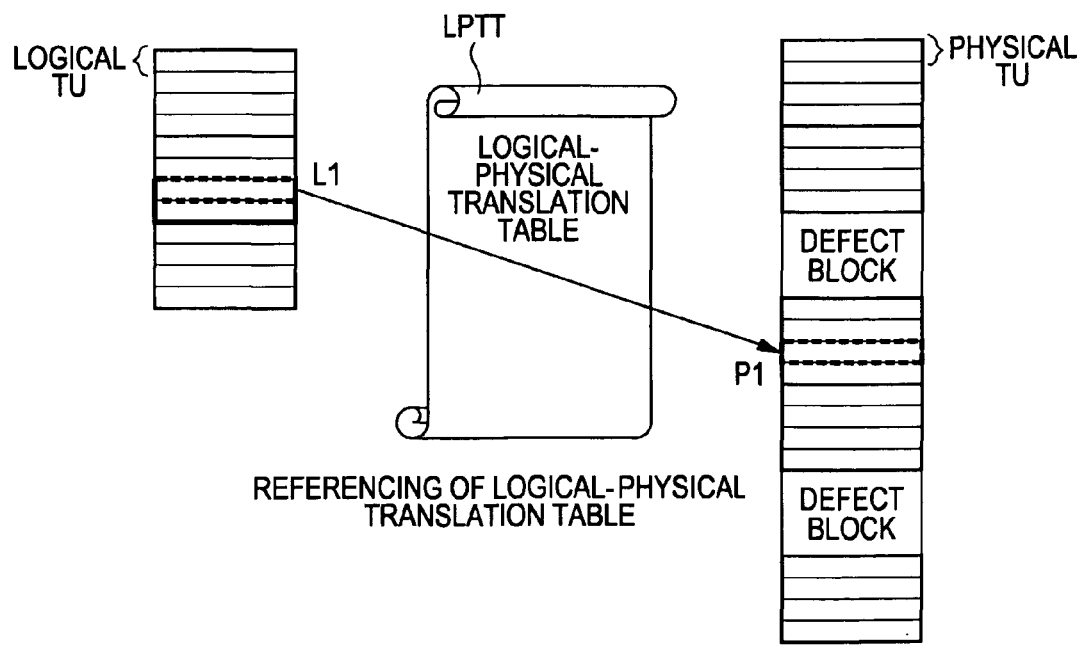
FIG. 8 is a diagram showing a read operation of a logical TU.

FIG. 8 is a diagram showing a read operation of a logical TU.

When reading a logical TU, as shown in FIG. 8, the CPU 13 finds a physical TU number corresponding to a logical TU number from the logical-physical translation table LPTT, and reads the corresponding physical TU. Through the intermediation of the logical-physical translation table LPTT, a defect block can be avoided.

<Writing of a Logical TU>

Figure 9:
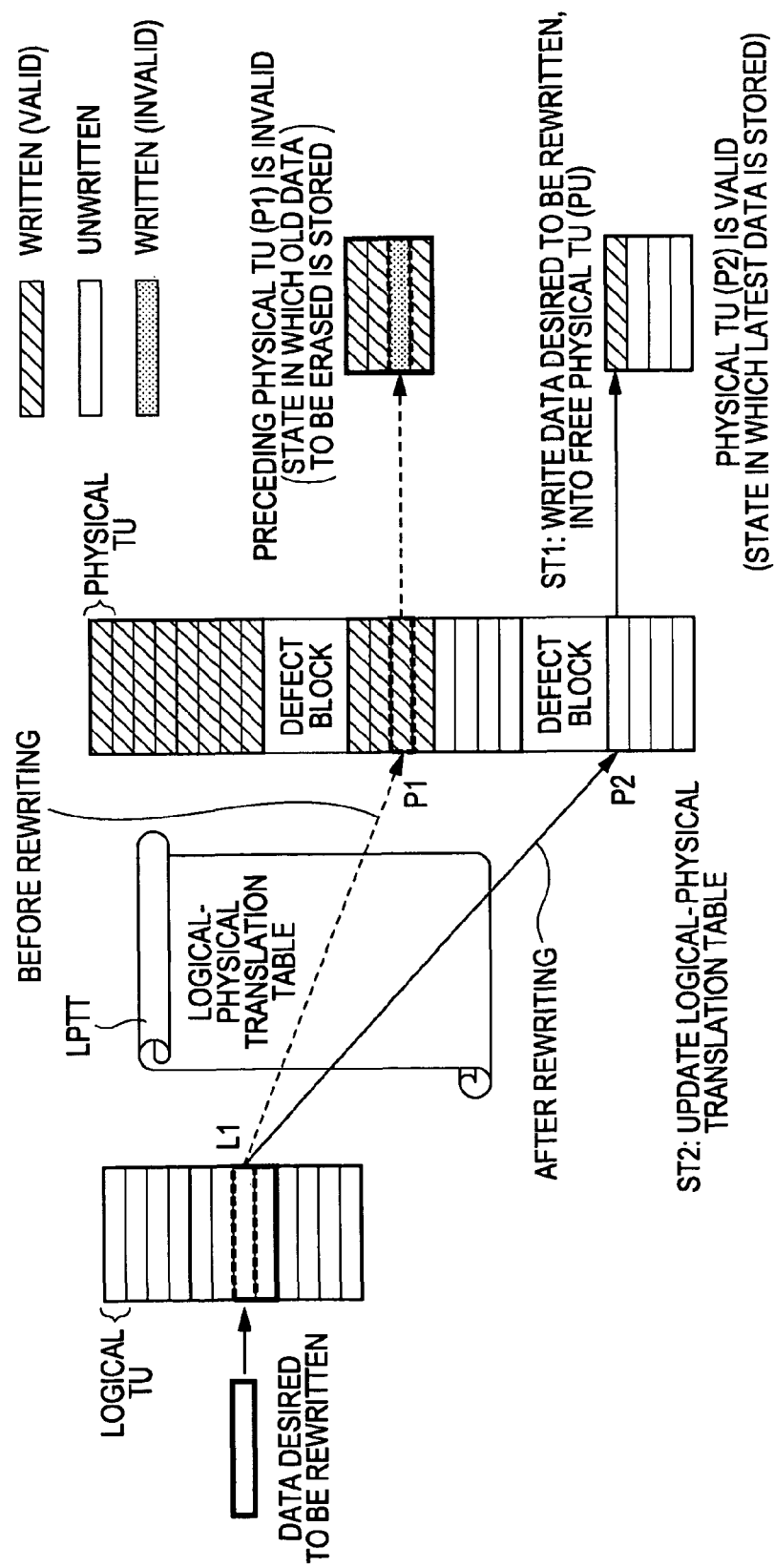
FIG. 9 is a diagram showing a write operation of a logical TU.

FIG. 9 is a diagram showing a write operation of a logical TU.

Prior to a write, a physical TU P1 corresponds to a logical TU L1.

The CPU 13 first writes data desired to be rewritten, into a physical TU P2 that has not been written yet (ST1 in FIG. 9).

Next, the CPU 13 makes the physical TU P2 into which data has been thus written correspond to the logical TU L1 of the logical-physical translation table LPTT (ST2 in FIG. 9).

In this case, a state in which the latest data is stored as in the physical TU P2 is referred to as valid, and a state in which old data that is to be erased is stored as in the preceding physical TU P1 is referred to as invalid.

<Fold>

Figure 10:
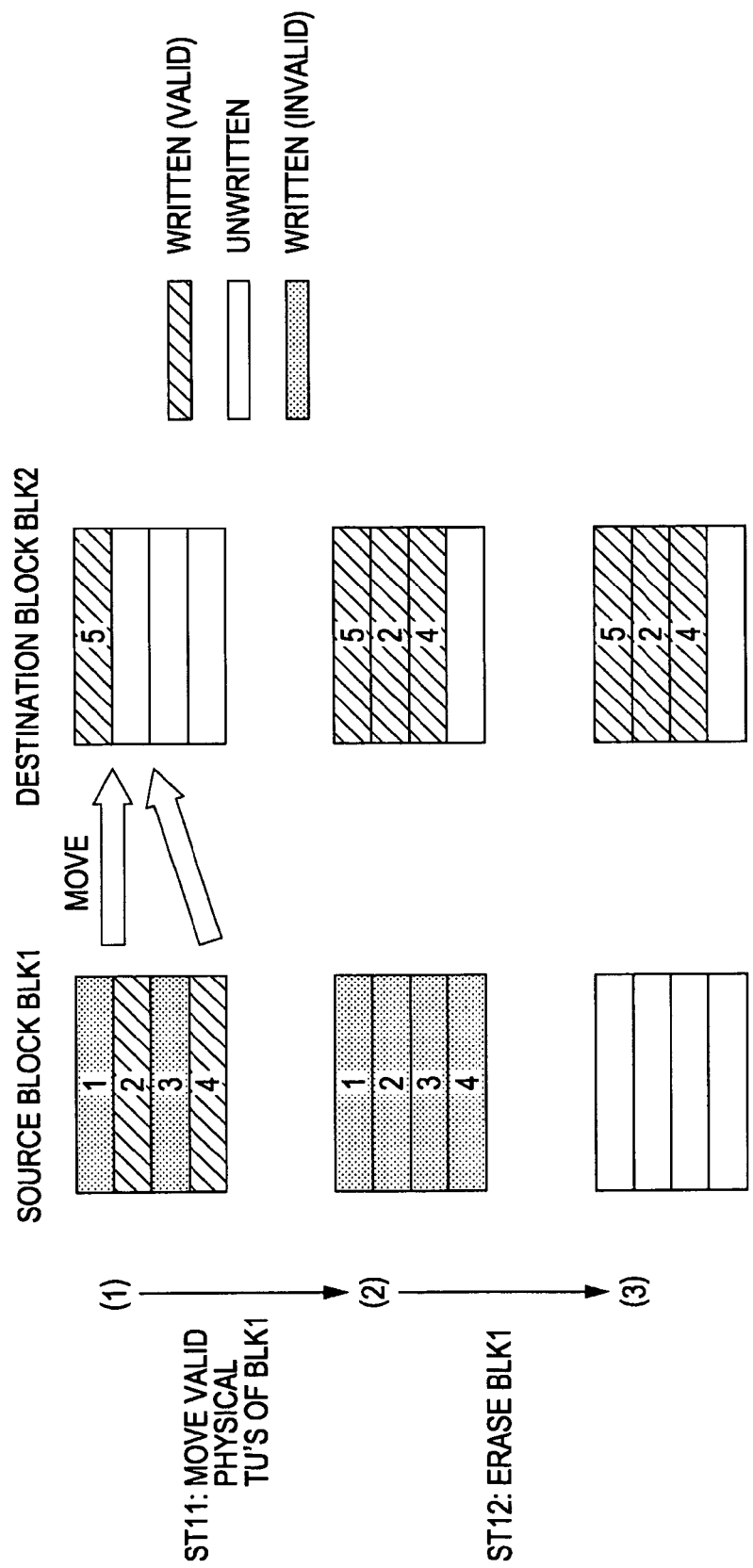
FIG. 10 is a diagram showing a fold operation according to an embodiment of the present invention.

FIG. 10 is a diagram showing a fold operation according to this embodiment.

Since NAND flash memory 11 can be erased only on a block BLK basis, if there is another physical TU within a block BLK like the physical TU P1 in FIG. 9, it is not possible to erase that physical TU even if the physical TU is invalid.

Therefore, as writing is repeated, the number of invalid physical TUs increases, while the number of unwritten physical TUs to which data can be written decreases.

Accordingly, as shown in FIG. 10, in order to reduce the number of invalid physical TUs and increase the number of unwritten physical TUs, the CPU 13 performs an operation of moving only valid physical TUs to a write target block BLK (ST11), and erasing the source block (ST12).

In this embodiment, this operation is referred to as a fold.

<Building of a Logical-Physical Translation Table>

The logical-physical translation table LPTT is information on the volatile memory 12, and is lost when power is turned off. The CPU 13 writes logical TU numbers into the spare area at the time of writing data into a physical TU so that, even in the above-mentioned case, the logical-physical translation table LPTT can be built from information on the NAND flash memory 11 after power is turned on.

At startup, the CPU 13 builds the logical-physical translation table LPTT on the memory 12 by scanning management information in the spare area of each physical TU.

It should be noted, however, that a physical TU that has become old (invalid physical TU) upon writing of a logical TU is not immediately erased. Thus, a situation occurs in which, like the physical TU P1 and the physical TU P2 in FIG. 9, for example, a plurality of physical TUs have the same logical TU number.

To find a valid physical TU corresponding to a logical TU number at the time of building the logical-physical translation table LPTT, it is necessary for the CPU 13 to determine the last written physical TU.

Figure 11:
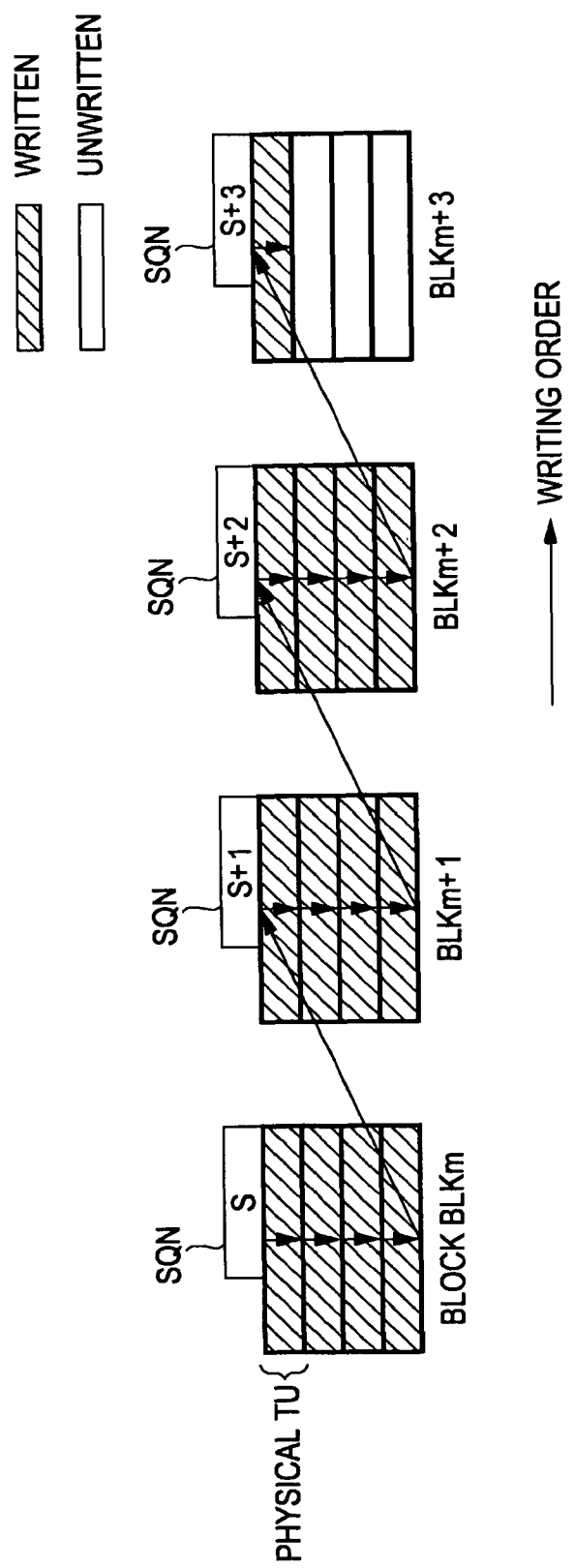
FIG. 11 is a diagram illustrating a specific example of how sequential numbers are assigned.

Accordingly, in this embodiment, as shown in FIG. 11, the CPU 13 performs writing in order from the lowest-ordered block while assigning sequential numbers SQN as information indicating the writing order of blocks BLK, to individual blocks BLK.

Figure 1:
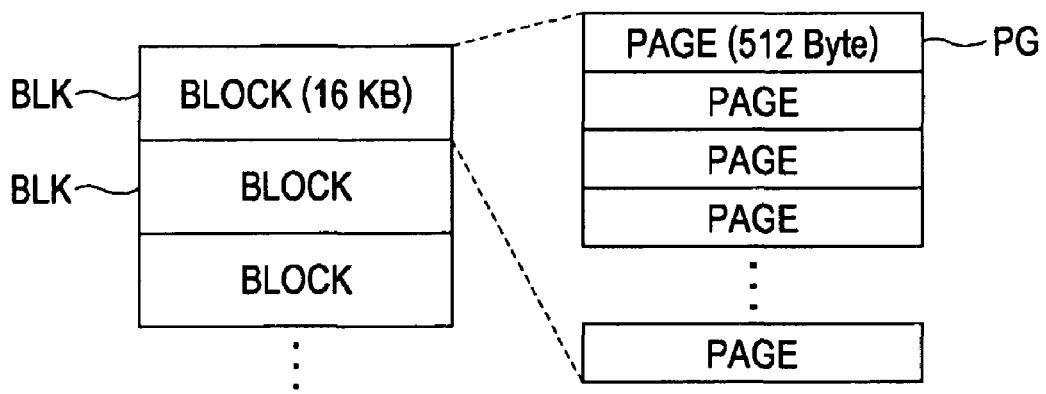
FIG. 1 is a diagram showing the relationship between blocks and pages of a NAND flash memory.
Figure 2:
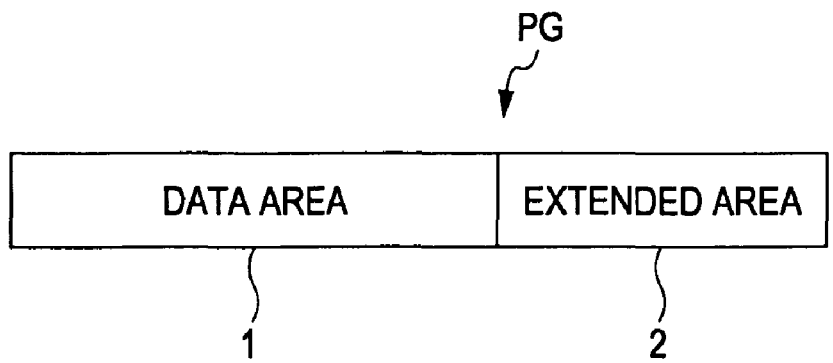
FIG. 2 is a diagram showing the general configuration of a page.
Figure 3A:
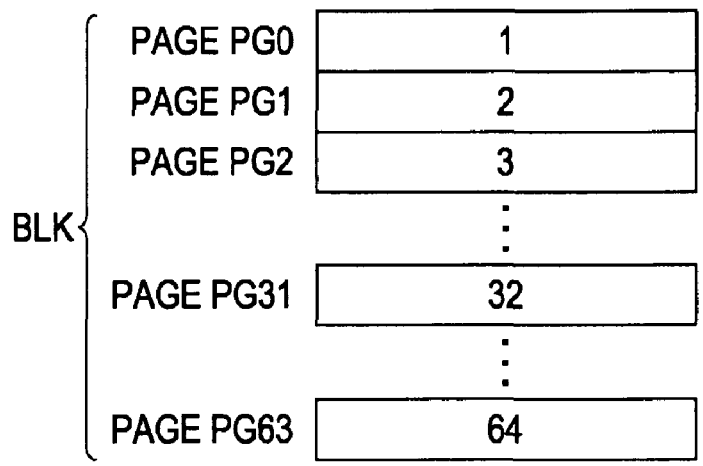
FIGS. 3A and 3B are diagrams illustrating the writing order of pages within a block.
Figure 3B:
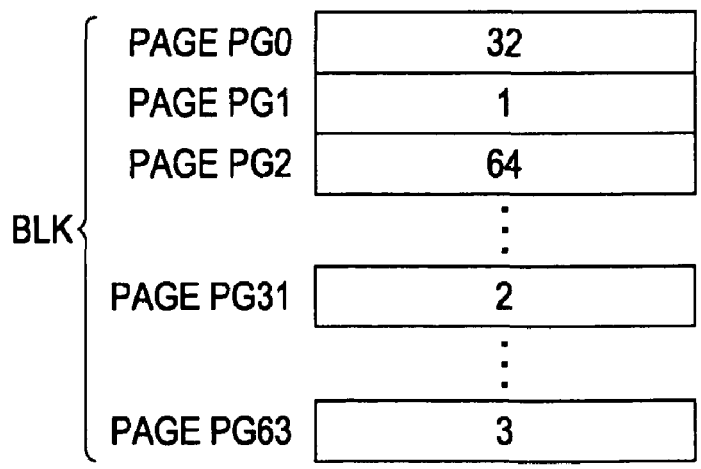

Within the same block BLK, the CPU 13 performs writing in order from a physical TU with the lowest physical TU number so that the writing order of pages within a block in FIGS. 3A and 3B is met.

When writing to a physical TU, the CPU 13 records a sequential number SQL into the spare area in addition to a logical TU number.

In the example of FIG. 11, S is assigned as a sequential number SQN to a block BLK BLKm, S+1 is assigned as a sequential number SQN to the next block BLK BLKm+1, S+2 is assigned as a sequential number SQN to the next block BLK BLKm+2, and S+3 is assigned as a sequential number SQN to the next block BLK BLKm+3.

Since the CPU 13 can uniquely find the writing order of physical TUs from sequential numbers SQL when building the logical-physical translation table LPTT, it is possible to determine the last written physical TU from among physical TUs having the same logical TU number, that is, a valid physical TU.

Next, a specific example of how a logical-physical translation table is built will be described with reference to FIG. 12 and FIGS. 13A to 13C.

Figure 12:
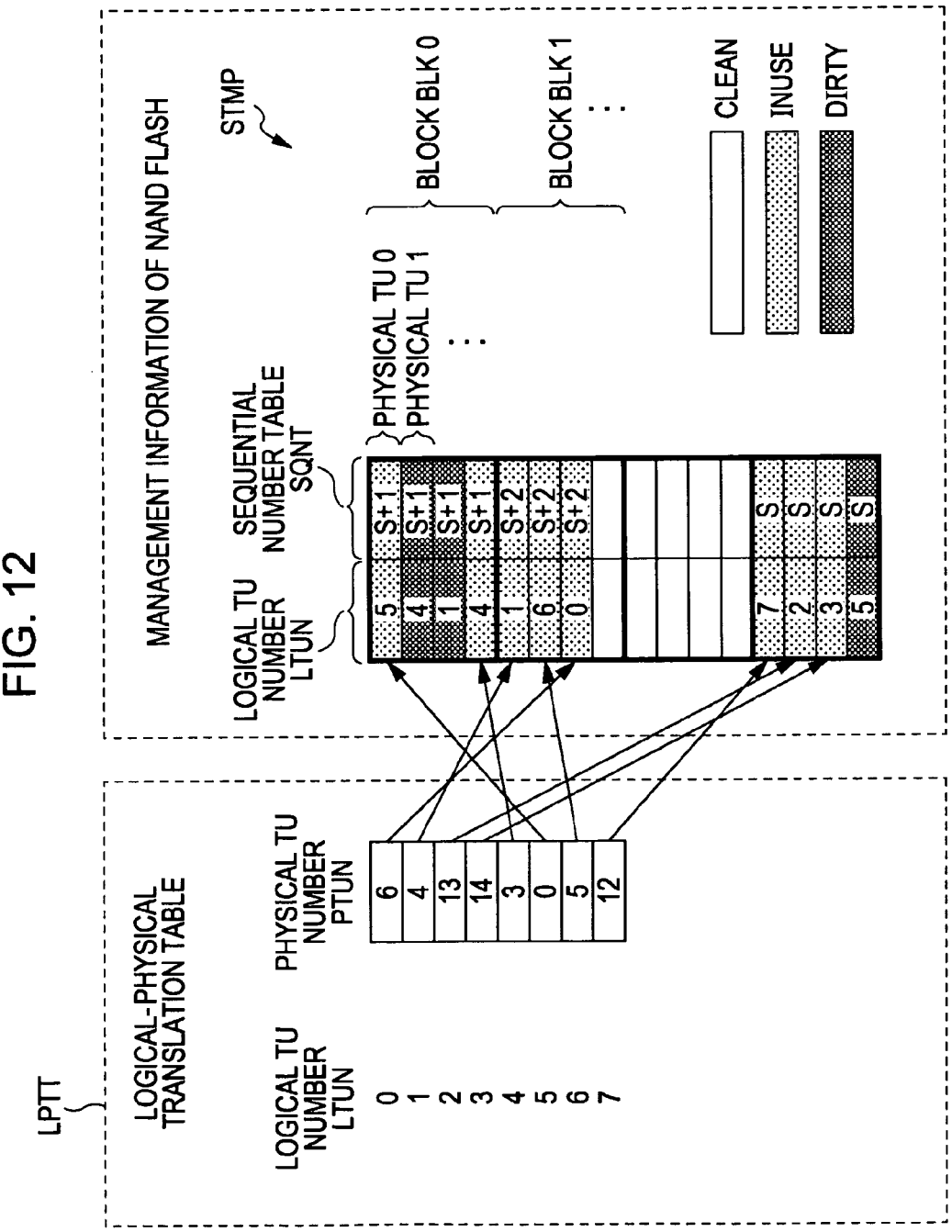
FIG. 12 is a diagram showing an example of the relationship between a logical-physical translation table on a memory and management information (a logical TU number LTUN and a sequential number (SQN)) written in the spare area of each physical TU of a NAND flash memory.

FIG. 12 is a diagram showing an example of the relationship between a logical-physical translation table on the memory and management information (a logical TU number LTUN and a sequential number (SQN)) written in the spare area of each physical TU of the NAND flash memory.

FIGS. 13A to 13C are diagrams showing how a logical-physical translation table is built by scanning the management information of the NAND flash memory in FIG. 12 in order from the physical TU0.

In FIGS. 13A to 13C, newly assigned physical TUs are pointed to by arrows (→) only with respect to items that have been updated in the logical-physical translation table LPTT. Also, the reason why the physical TU indicated by (*) in the drawing is determined as DIRTY is described.

FIG. 13A shows a state immediately after scanning of a block BLK0.

In this case, in the block BLK0, the physical TU indicated by (*) is determined as DIRTY because a physical TU3 having the same logical TU number 4 is newer.

FIG. 13B shows a state immediately after scanning of a block BLK1.

In this case, in blocks BLK0 and BLK1, the physical TU of the block BLK0 which is indicated by (*) is determined as DIRTY because a physical TU4 having the same logical TU number 1 is newer.

FIG. 13C shows a state immediately after scanning of blocks BLK2, BLK3.

In this case, in blocks BLK3 and BLK0, the physical TU of the block BLK3 which is indicated by (*) is determined as DIRTY because a physical TU0 having the same logical TU number 5 is newer.

Next, various specific operations based on the above-mentioned configuration will be described while focusing on the control of the CPU 13.

First, a read operation of a logical TU will be described.
<Reading of a Logical TU>

The CPU 13 translates the number of a logical TU to be read, into a physical TU number by referencing the logical-physical translation table LPTT stored in the memory 12. Then, the CPU 13 identifies a physical TU from which data is to be read, and reads its data area.

Next, a write operation of a logical TU will be described.
<Writing of a Logical TU>

Figure 14:
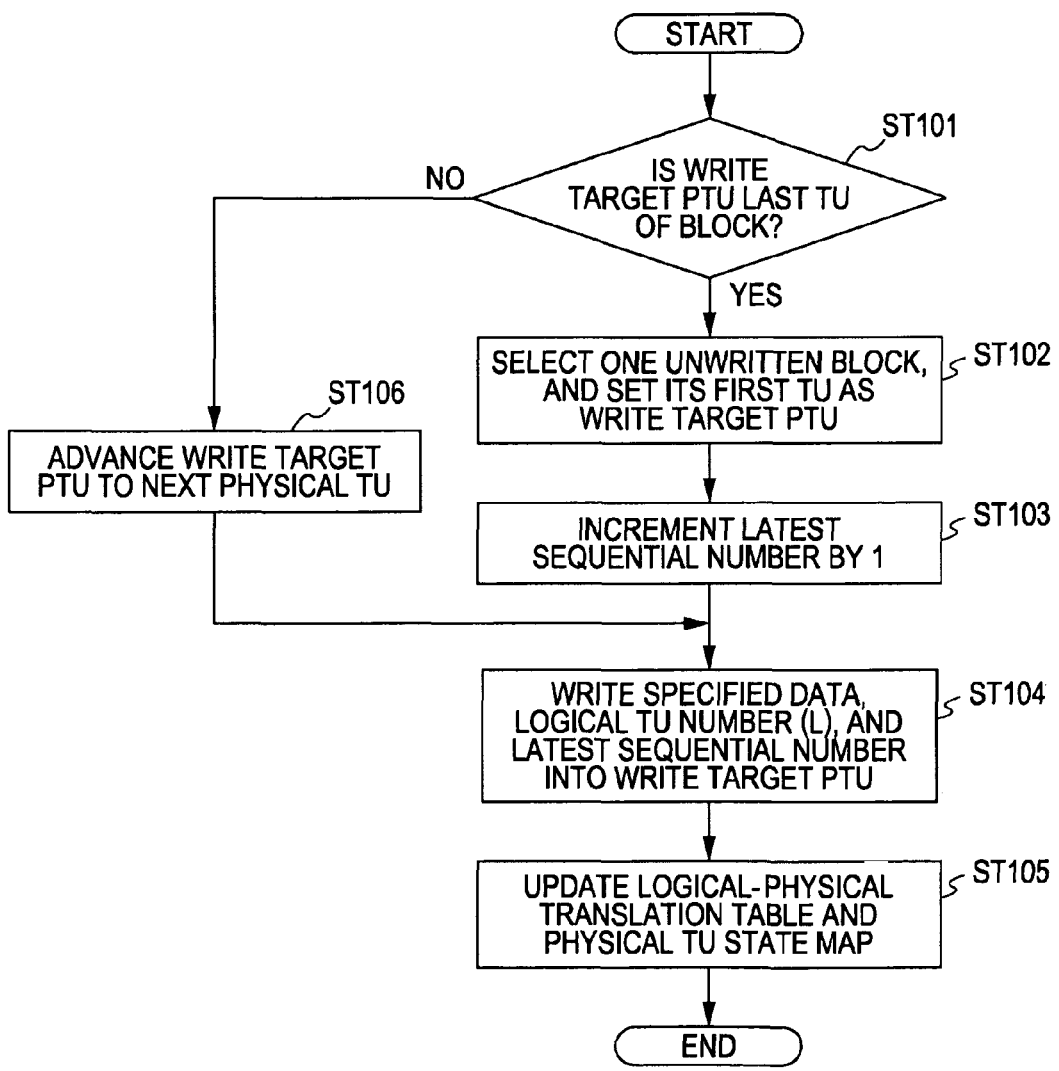
FIG. 14 is a flowchart showing a data write operation.

FIG. 14 is a flowchart showing a data write operation.

In FIG. 14, a physical TU is expressed as a PTU.

The CPU 13 first determines whether or not a write target PTU is the last TU of a block (ST101).

If it is determined in step ST101 that a write target PTU is the last TU of a block, the CPU 13 selects one block that has not been written yet, and sets its first TU as a write target PTU (ST102).

Then, the latest sequential number SQL is incremented y 1 (ST103).

Next, specified data, a logical TU number (L), and the latest sequential number SQL are written to the write target PTU (ST104).

Next, the CPU 13 updates the logical-physical translation table LPTT, and a physical TU state map STMP (ST105).

If it is determined in step ST101 that a write target PTU is not the last TU of a block, the processing proceeds not to step ST102 but to step ST106, and the write target PTU is advanced to the next physical TU, and the processing proceeds to step ST104.

In this way, when writing a logical TU number, writing is performed with respect to a CLEAN, lowest-numbered physical TU continuous from the last physical TU within a block BLK having the latest sequential number SQN.

If the last physical TU is not CLEAN, an unwritten block (block of which all physical TUs are CLEAN) is randomly selected, and the sequential number SQN is advanced by 1 step and written into that block (this physical TU set as a write target is referred to as write target PTU, and a block including the write target PTU is referred to as target block).

In step ST105, the logical-physical translation table LPTT and the physical TU state map are updated as follows.

In the physical TU state map STMP, the state of a physical TU previously corresponding to a logical TU L in the logical-physical translation table LPTT is set to DIRTY, and the state of the write target PTU is set to INUSE.

In the logical-physical translation table LPTT, the write target PTU is made to correspond to the logical TU L.

Next, a fold operation will be described.
<Fold>

Figure 15:
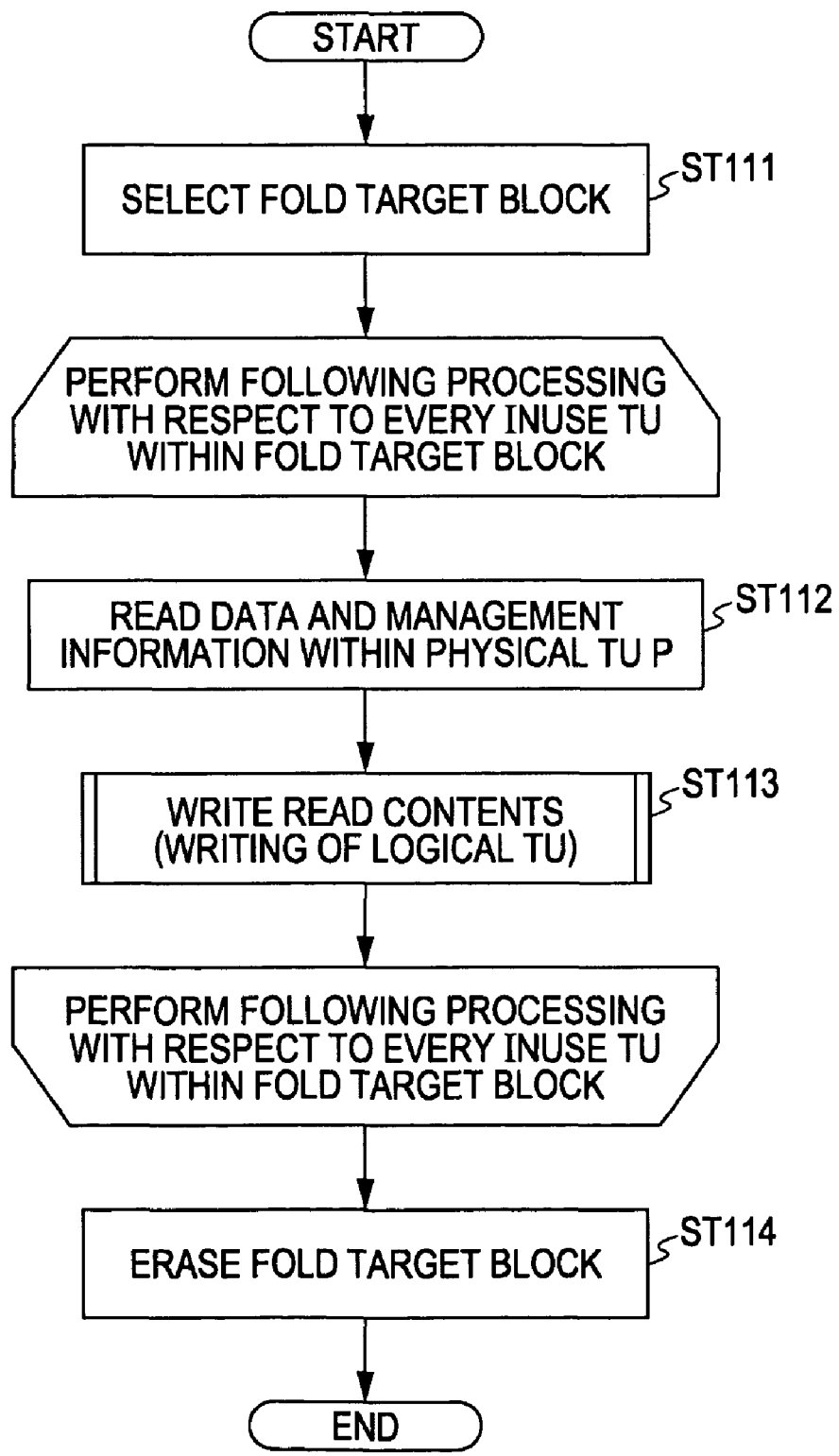
FIG. 15 is a flowchart showing a fold operation according to an embodiment of the present invention.

FIG. 15 is a flowchart showing a fold operation according to this embodiment.

In the flowchart in FIG. 15, a physical TU on which fold processing is being performed is expressed as P.

The CPU 13 selects a block including at least one DIRTY physical TU as a fold target block (ST111).

The following processing is performed with respect to every INUSE TU within the fold target block.

Data and management information within a physical TU are read (ST112).

Next, by specifying data and logical TU number read in step ST112, the read contents are written. In other words, writing of a logical TU is performed (ST113).

After the above-mentioned processing is performed with respect to every INUSE TU within the fold target block, the fold target block is erased.

Next, building of a table at startup will be described.
<Building of a Table at Startup>

The logical-physical translation table LPTT and the physical TU state map STMP are data on the memory 12, and are lost when power is turned off.

In this embodiment, the logical-physical translation table LPTT and the physical TU state map STMP can be restored even in that case by scanning the management information (logical TU numbers LTUN and sequential numbers SQL) written into the spare area 23 of the NAND flash.

Figure 16:
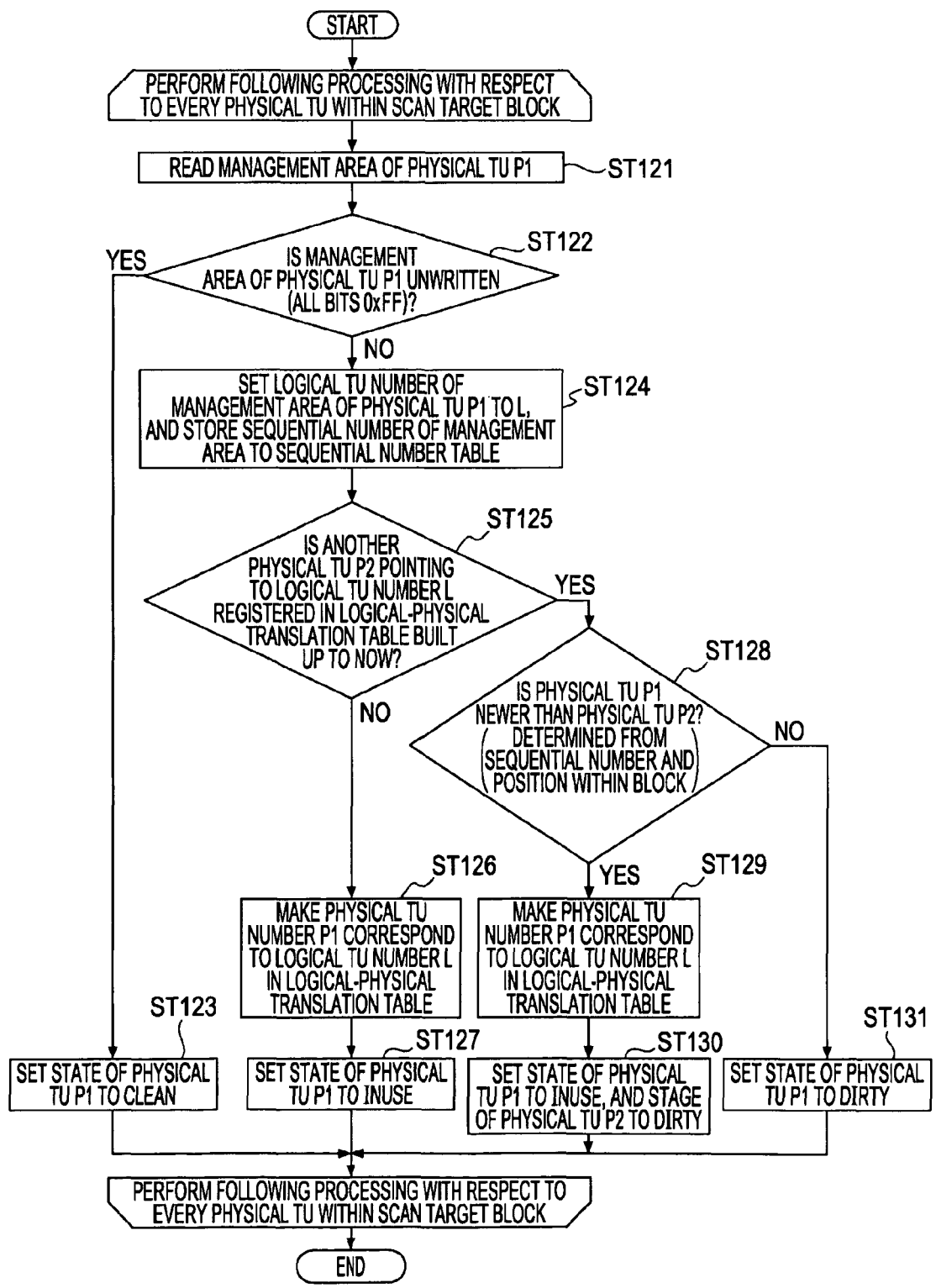
FIG. 16 is a flowchart showing scanning of a spare area on a block by block basis, and a procedure for restoring a logical-physical translation table and a physical TU state map.

FIG. 16 is a flowchart showing scanning of a spare area on a block by block basis, and a procedure for restoring a logical-physical translation table and a physical TU state map.

In the flowchart in FIG. 16, the physical TU being currently scanned is expressed as P1.

In the scanning of a spare area of the NAND flash, the following processing is performed with respect to every block within a scan target block other than defect blocks.

The CPU 13 reads the storing area (herein referred to as management area) 231, 232 of the management information 22 in the spare area 23 of the physical TU P1 (ST121).

Next, it is determined whether or not the management area is unwritten (all bytes set to 0xFF) (ST122).

If it is determined in step ST122 that the management area is unwritten, the state of the physical TU P1 is set to CLEAN (ST123).

If it is determined in step ST122 that the management area is not unwritten, the logical TU number of the management area of the physical TU P1 is set to L. The sequential number SQN in the management area is stored into the sequential number table SQNT (ST124).

Next, it is determined whether or not another physical TU P2 pointing to the logical TU number L is registered in the logical-physical translation table LPTT that has been built up to now (ST125).

If it is determined in step ST125 that no another physical TU P2 is registered, in the logical-physical translation table LPTT, the physical TU number P1 is made to correspond to the logical TU number L (ST126).

Then, the state of the physical TU P1 is set to INUSE (ST127).

If it is determined in step ST125 that another physical TU P2 is registered, it is determined whether or not the physical TU P1 is newer than the physical TU P2 (ST128). This is determined from the sequential number SQL and the position within the block.

If it is determined in step ST128 that the physical TU P1 is newer than the physical TU P2, in the logical-physical translation table LPTT, the physical TU number P1 is made to correspond to the logical TU number L (ST129).

Then, the state of the physical TU P1 is set to INUSE, and the state of the physical TU P2 is set to DIRTY (ST130).

If it is determined in step ST128 that the physical TU P1 is not newer than the physical TU P2, the state of the physical TU P1 is set to DIRTY (ST131).

The above-mentioned processing is performed with respect to every physical TU within the scan target block.

In this way, when building a table at startup, if there are a plurality of physical TUs that have the same logical TU number, the most recently written physical TU is determined as INUSE, and the other physical TUs are determined as DIRTY.

The writing order can be determined from the sequential number and the position within the block.

Figure 17:
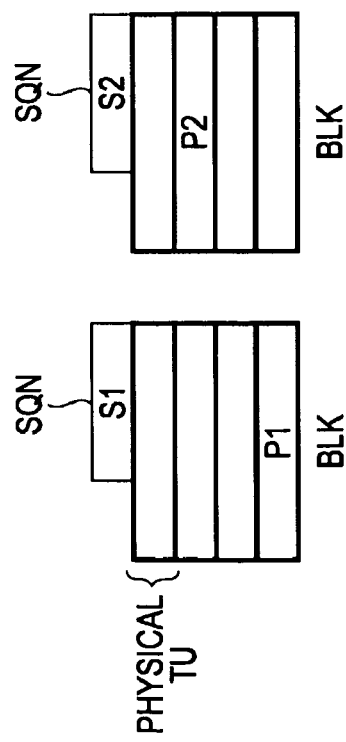
FIGS. 17A and 17B are diagrams illustrating a process of determining whether physical TUs are new or old.

FIGS. 17A and 17B are diagrams illustrating a process of determining whether physical TUs are new or old.

As shown in FIG. 17A, if physical TUs are present in different blocks, which physical TU is newer or older is determined by a size comparison of sequential numbers. In this example, since the sequential number SQN S1<S2, it is determined that the physical TU P2 is newer than the physical TU P1.

As shown in FIG. 17B, if physical TUs are present within the same block, since the physical TU number PTUN P2<P1, it is determined that the physical TU P1 is newer than the he physical TU P2.

<Measures Against Power Supply Cutoff During Writing to or Erasing of the NAND Flash Memory>

Next, a description will be given of a method devised to bring the storage state of data in the NAND flash memory 11 to the normal state following a system return process carried out after occurrence of a system down due to a power outage or an operation failure.

When a power supply cutoff occurs during writing to the NAND flash memory 11, the value of data or management information in the physical TU being currently written to may have been left in a somewhat incomplete state. Also, when a power supply cutoff occurs during erasure of the NAND flash memory 11, data or management information in the physical TU within the block being currently erased may remain without being completely erased.

It is thus necessary to provide a mechanism for preventing a situation where such a physical TU in a somewhat incomplete state is regarded as a valid physical TU and used, or is regarded as unwritten so that data is written over such a physical TU.

Accordingly, the following mechanism is added.

<Measures Against Power Supply Cutoff During Writing>

Figure 18:
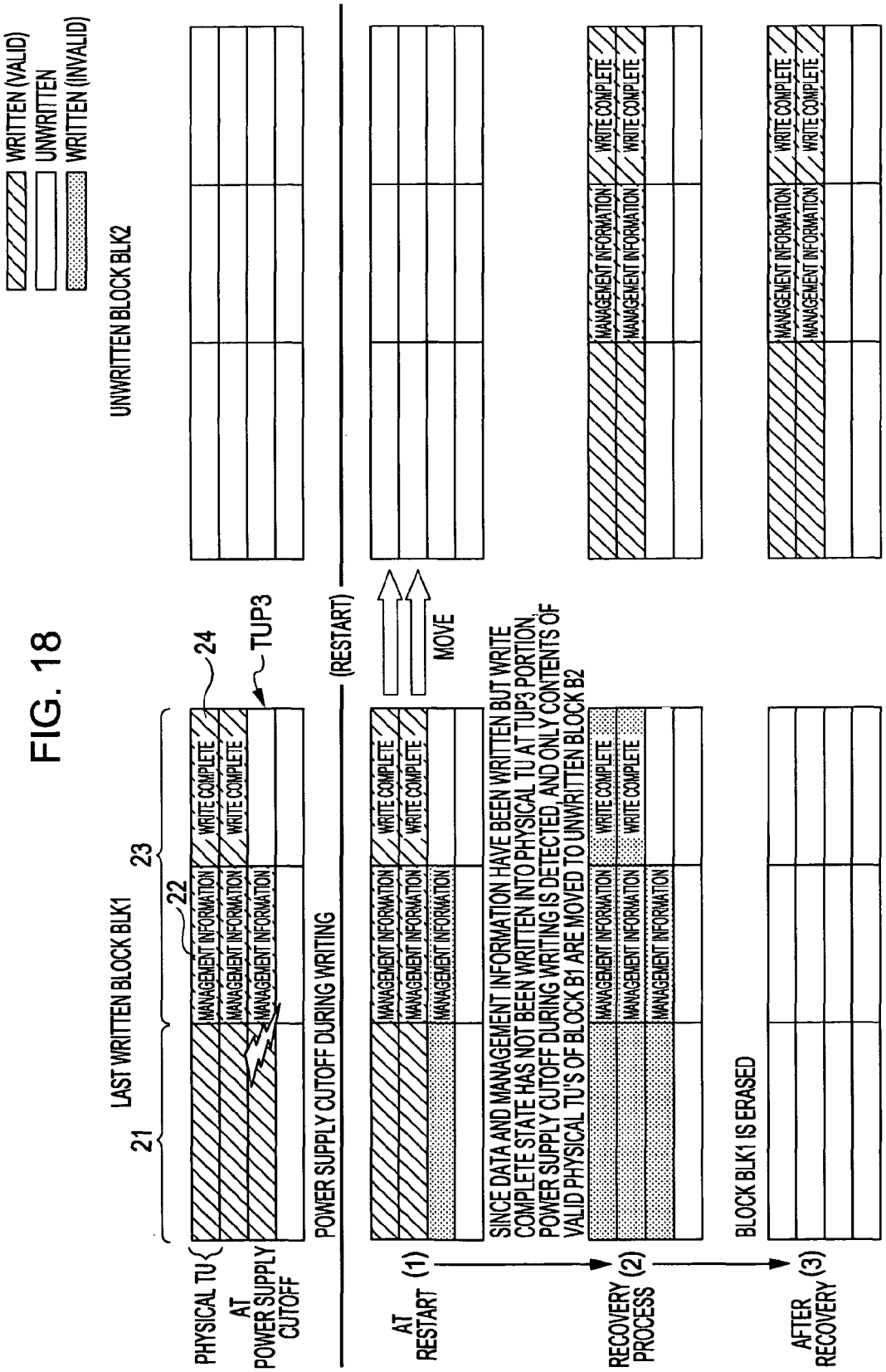
FIG. 18 is a diagram showing an example of a power supply cutoff during writing and recovery process.

FIG. 18 is a diagram showing an example of a power supply cutoff during writing and recovery process.

As shown in FIG. 18, immediately after writing of data and management information, state (write complete state) information 24 indicating completion of writing is additionally written into the spare area 23.

At restart, by checking the write complete state with respect to the last written block (block having the latest sequential number), a physical TU being currently written to is detected.

For example, as shown in FIG. 18, at restart, data and management information have been written but write complete state information has not been written with respect to the physical TU P3. Thus, the CPU 13 detects a power supply cutoff during writing.

Then, the contents of only valid physical TUs of the block BLK1 are moved to the block BLK2 that has not been written yet.

Then, the block BLK1 is erased.

That is, upon detecting a physical TU that is being currently written to, the recovery process as shown in FIG. 18 is performed to erase the physical TU that is being currently written to.

<Measures Against Power Supply Cutoff During Erasure>

Figure 19:
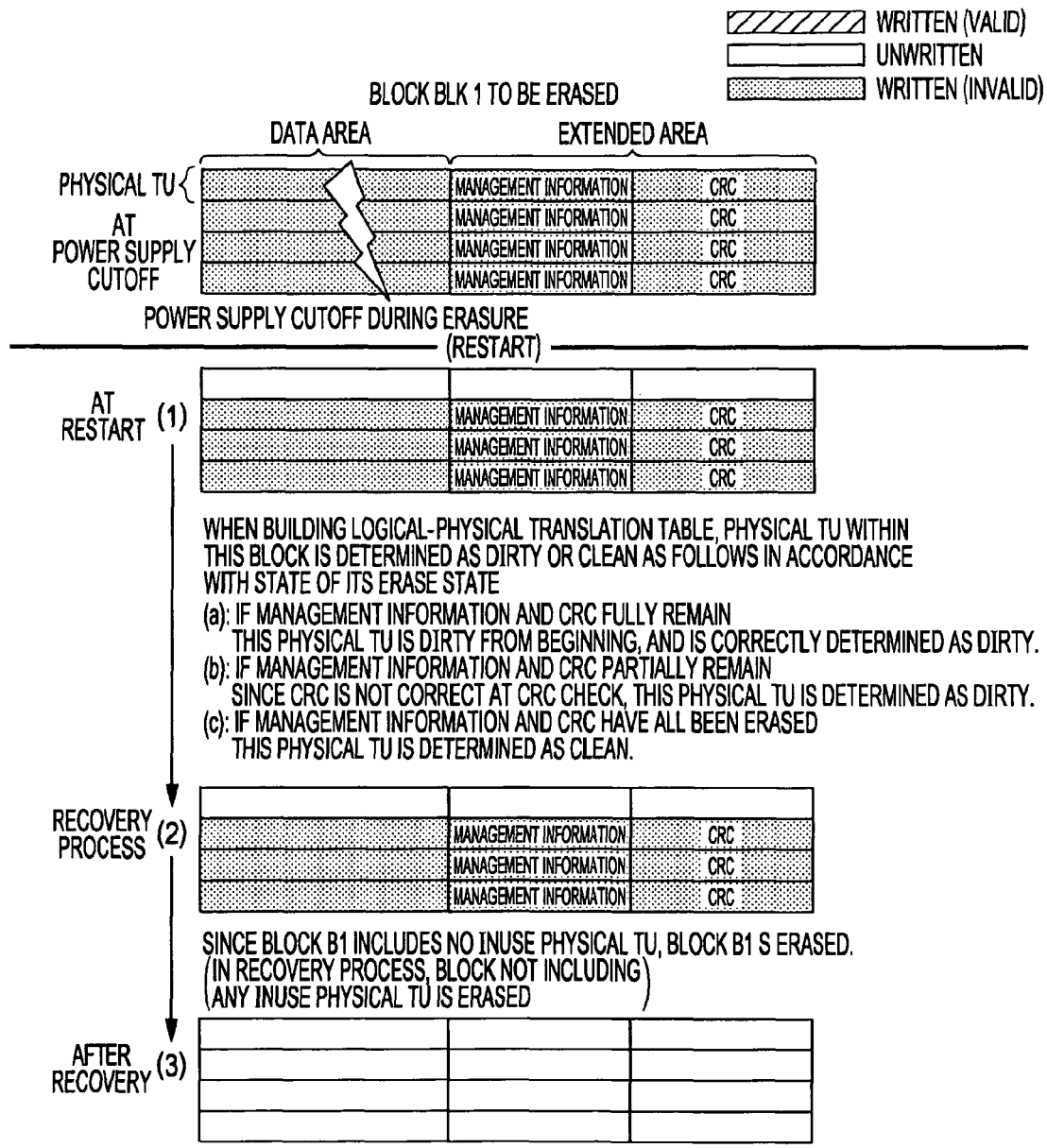
FIG. 19 is a diagram showing an example of a power supply cutoff during erasure and recovery process.

FIG. 19 is a diagram showing an example of a power supply cutoff during erasure and recovery process.

As shown in FIG. 19, a CRC 25 with respect to the management information 22 is added to the spare area 23.

At restart, by checking the CRC of management information, it is checked whether or not the value of the management information is correct.

FIG. 19 illustrates that even when a power supply cutoff occurs during erasure and thus the data area 21 or the spare area 23 is left in an incorrect state, the block that was being erased is erased again by a recovery process.

For example, as shown in FIG. 19, when building a logical-physical translation table, a physical TU within this block is determined as DIRTY or CLEAN as follows, in accordance with its erase state.

(a): If management information and CRC fully remain, this physical TU is DIRTY from the beginning, and is correctly determined as DIRTY.

(b): If management information and CRC partially remain, the CRC check is not correct, so this physical TU is determined as DIRTY.

(c): If management information and CRC have all been erased, this physical TU is determined as CLEAN.

Then, since the block BLK has no INUSE physical TU, the block BLK is erased. In the recovery process, a block not including any INUSE physical TU is erased.

Next, a description will be given of a difference from the operation described in the "description of operation" of the previous section, with respect to a case where measures against a power supply cutoff are taken.

<Writing of a Logical TU>

Figure 20:
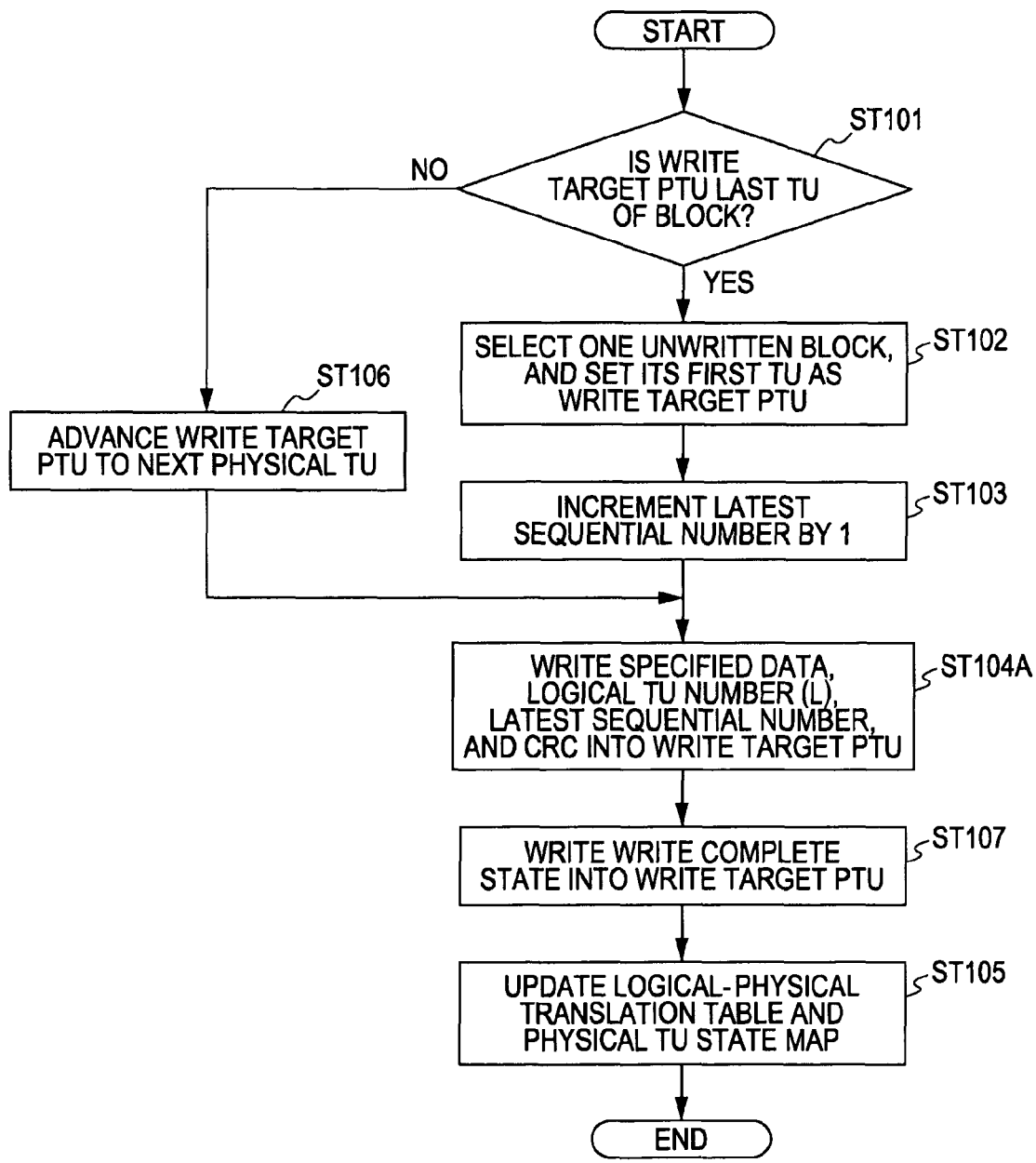
FIG. 20 is a flowchart of a write operation of a logical TU in a case where measures against a power supply cutoff are taken.

FIG. 20 is a flowchart of a write operation to a logical TU in a case where measures against a power supply cutoff are taken.

Comparing the process in FIG. 20 and the process in FIG. 14, the difference resides in adding a CRC to the management information to be written into the spare area, and providing, before the processing of step ST105, step ST107 in which immediately after writing of data and management information, a state indicating the completion of writing is additional written.

<Building of a Logical-Physical Translation Table>

Figure 21:
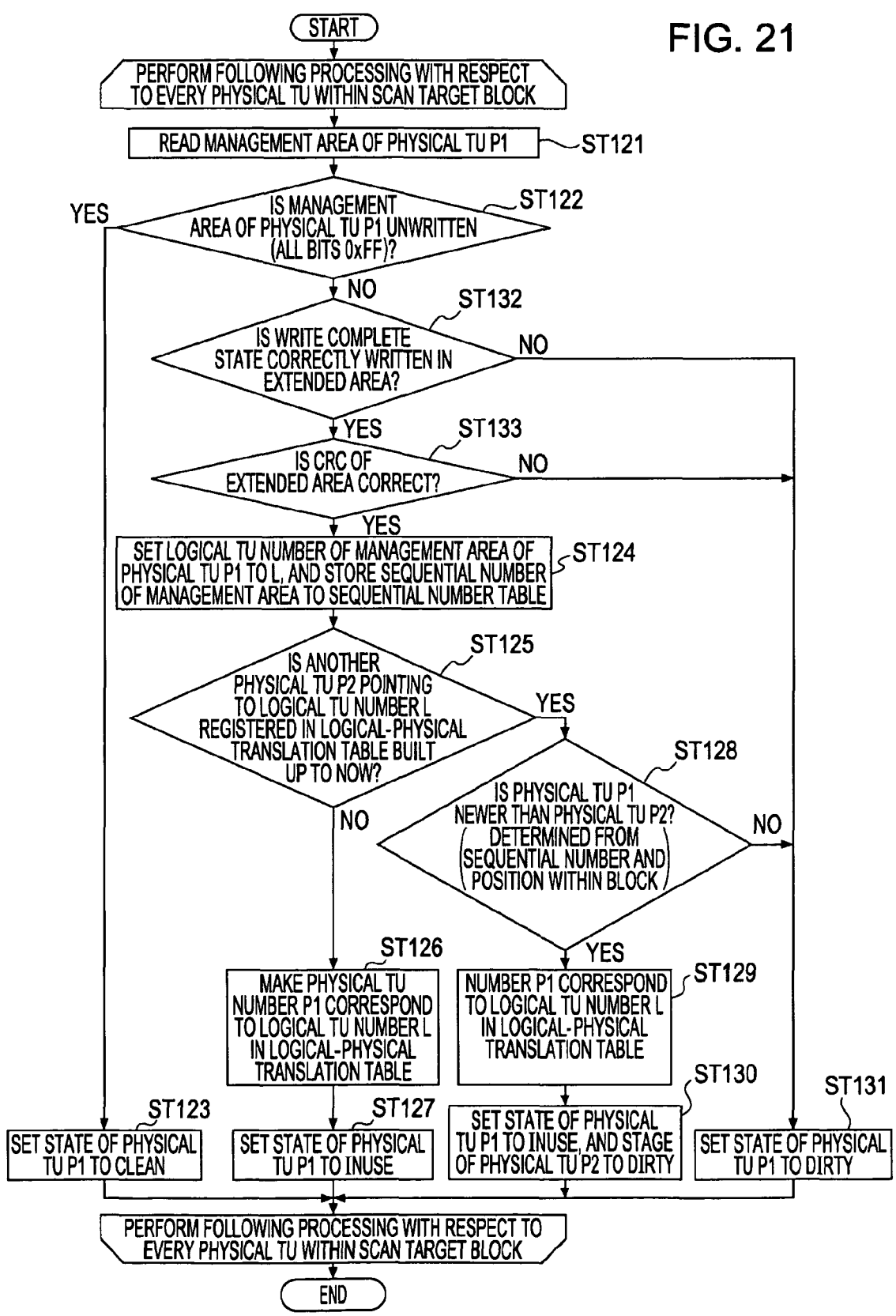
FIG. 21 is a flowchart showing scanning of a spare area on a block by block basis, and a procedure for restoring a logical-physical translation table and a physical TU state map in a case where measures against a power supply cutoff are taken.

FIG. 21 is a flowchart of a write operation of a logical TU in a case where measures against a power supply cutoff are taken.

Comparing the process in FIG. 21 and the process in FIG. 16, the difference resides in proving step ST132 in which, if the result of the determination in step ST122 is negative, it is determined whether or not write complete state information is correctly written in the spare area, and step ST133 in which, if it is determined that write complete state information is correctly written, it is determined whether or not the CRC of the spare area is correct.

After a logical-physical translation table is built, a recovery process is further performed.

Figure 22:
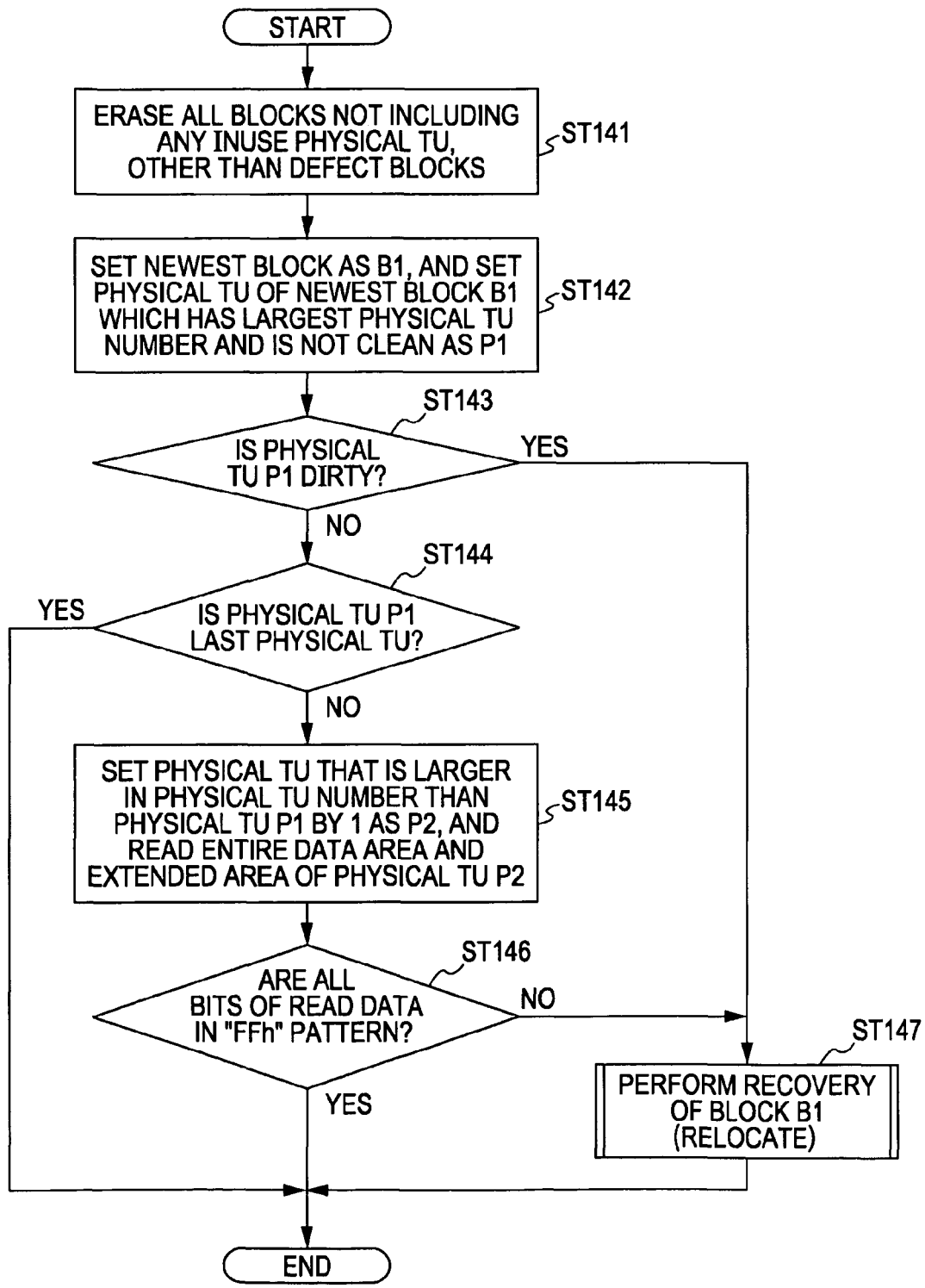
FIG. 22 is a flowchart showing a recovery process from a power supply cutoff during writing or erasure.

FIG. 22 is a flowchart showing a recovery process from a power supply cutoff during writing or erasure.

For example, all blocks not including any INUSE physical TU, other than defect blocks, are erased (ST141). At this time, a recovery process for a power supply cutoff during erasure is performed.

Next, the newest block is set as B1 and a physical TU in the newest block B1 which is not CLEAN and has the largest physical TU number is set as P1 (ST142).

It is determined whether or not the physical TU P1 is DIRTY (ST143).

If it is determined in step ST143 that the physical TU P1 is not DIRTY, it is determined whether or not the physical TU P1 is the last physical TU of the block B1 (ST144).

If it is determined in step ST144 that the physical TU P1 is not the last physical TU, a physical TU that is larger in physical TU number by 1 than the physical TU P1 is set as P2. Then, the entire data area 21 and spare area 23 of the physical TU P2 are read (ST145).

Next, it is determined whether or not all bytes of the data thus read are in the "FFh" pattern (ST146). If it is determined in step ST146 that all bytes of the read data are in the "FFh" pattern, if it has been determined in step ST144 that the physical TU P1 is the last physical TU, the processing is terminated.

On the other hand, if it is determined in step ST143 that the physical TU P1 is DIRTY, or if it is determined in step ST146 that not all bytes of the read data are in the "FFh" pattern, the recovery process (relocate) of the block B1 is performed (ST147).

In step ST147, a recovery process (relocate) for a power supply cutoff during writing is performed.

Figure 23:
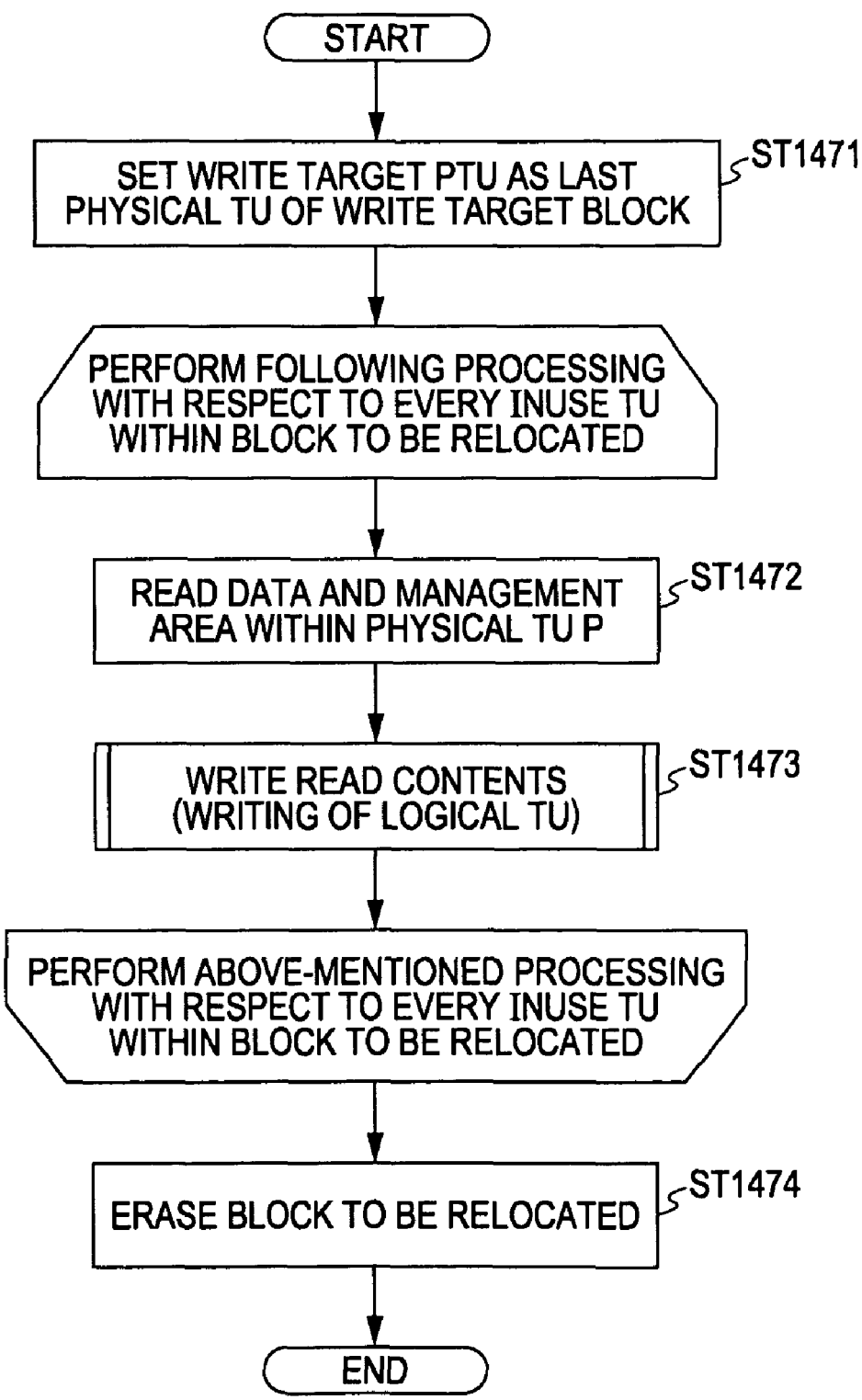
FIG. 23 is a flowchart of a relocate process.

FIG. 23 is a flowchart of a relocate process.

In the flowchart of FIG. 23, the physical TU on which a relocate process is being performed is expressed by P.

The write target PTU is set to the last physical TU of the write target block (ST1471).

The following processing is performed with respect to every INUSE TU within a block to be relocated.

Data and the management area (storage area where management information is stored) within a physical TU are read (ST1472).

The read contents are written (ST1473).

The above-mentioned processing is performed with respect to every INUSE TU within the block to be relocated.

Then, the block to be relocated is erased (ST1474).

It should be noted that the reason why the write target PTU is set as the last physical TU of a block in advance in step ST1471 is to set the first physical TU of an unwritten block as the physical TU from which writing is started in step ST1473.

As described in the foregoing, according to this embodiment, the CPU 13 manages access to the NAND flash memory 11 by performing logical-physical translation in translation units (TUs) each being an integer fraction of a block size and an integer multiple of a page size. The CPU 13 has the function of performing an operation control of copying, from among the contents of a source block, only all physical blocks being currently in use to another block having unused physical TUs, and erasing the source block, thereby increasing unused physical TUs additionally a number equal to the number of invalid physical TUs included in the source block. Also, the CPU 13 has the function of writing a corresponding logical TU number, and a sequential number indicating the writing order of blocks into a spare area of the NAND flash memory, thereby building a logical-physical translation table solely from information in the spare area of the NAND flash memory at restart, and storing the logical-physical translation table into the memory 12. Therefore, the following advantages can be attained.

The unit of logical-physical translation can be selected as a size not smaller than the page size but not larger than the block size. It is thus possible to realize logical-physical translation adapted to a unit as requested by the file system or the like.

Since all pieces of information necessary for building management information such as a logical-physical translation table are stored in the spare area of the NAND flash, the utilization of the NAND flash can be enhanced (it is not necessary to use the data area of the NAND flash or to use an additional non-volatile memory to store information necessary for building management information such as a logical-physical translation table).

When writing data into the NAND flash, information necessary for building management information such as a logical-physical translation table is also written simultaneously. Thus, it is not necessary to perform additional writing of management information related to logical-physical translation, thus allowing for efficient rewriting of data.

Also, the CPU 13 has the function of writing state information indicating the completion of writing and the CRC of management information in the spare area, into the spare area of the NAND flash memory 11, thus allowing recovery to the normal state from a power supply cutoff during writing to or erasing of the NAND flash memory 11. It is thus possible to provide a mechanism for returning to the normal storage state even in the event of a system down during writing to or erasing of the NAND flash due to a power outage or the like.

Also, the method described above in detail can be also configured such that the method is implemented as a program according to the above-mentioned procedure, and is executed by a computer such as a CPU.

Also, such a program can be also configured such that the program is executed by being accessed from a computer in which a recording medium such as a semiconductor memory, a magnetic disc, an optical disc, or a floppy (R) disc is loaded.

It should be understood by those skilled in the art that various modifications, combinations, sub-combinations and alterations may occur depending on design requirements and other factors insofar as they are within the scope of the appended claims or the equivalents thereof.

What is claimed is:

1. A memory device comprising:
a non-volatile memory which allows data to be written, read, and erased electrically and in which writing and reading are done in units of a page and erasing is done in units of a block including a plurality of pages, a physical translation unit (TU) in the non-volatile memory including a data area and a spare area;
a volatile memory; and
a control section that manages access to the non-volatile memory, wherein the control section
 performs management of access to the non-volatile memory by performing logical address-physical address translation (logical-physical translation) in TUs each being a fraction of a size of the block and a multiple of a page size,
 writes management information including a corresponding logical TU number, and a sequential number indicating the write order of each block, into the spare area of the non-volatile memory,
 builds a logical-physical translation table at startup by scanning the management information in the spare area of the non-volatile memory, and stores the logical-physical translation table into the volatile memory, and
 performs a logical-physical translation process based on the logical-physical translation table on the memory,
 restores, at the startup, a physical TU state map for managing a physical TU, in parallel with building the logical-physical translation table by scanning the management information in the spare area of the non-volatile memory; and
 wherein the physical TU state map indicates whether the physical TU is in an unwritten, CLEAN state after an erase operation, an INUSE state in which valid data referenced from the logical-physical translation table is stored, or an INVALID state in which invalid data not referenced from the logical-physical translation table is stored.

2. The memory device according to claim 1, wherein:
the control section performs an operation of copying, of contents of a source block, only all physical TUs that are being currently used to a block with unused physical TUs, and erasing the source block to increase unused physical TUs additionally by a number equal to the number of invalid physical TUs included in the source block.

3. The memory device according to claim 1, wherein:
when writing a logical TU number into the spare area, the control section performs writing to a physical TU within a block having the latest sequential number which is a lowest-numbered, CLEAN physical TU sequential from its last physical TU.

4. The memory device according to claim 3, wherein:
if the last physical TU is not CLEAN, the control section randomly selects a block that has not been written yet, advances the sequential number by step, and writes the sequential number into the block.

5. The memory device according to claim 4, wherein:
the control section updates the physical TU state map by setting a state of a physical TU previously corresponding to a logical TU to INVALID, and setting a state of a write target physical TU to INUSE, and updates the logical-physical translation table by rewriting to the write target physical TU.

6. The memory device according to claim 1, wherein:
when performing a fold operation that is an operation of copying, of contents of a source block, only all physical TUs that are being currently used to a block with unused physical TUs, and erasing the source block to increase unused physical TUs additionally by a number equal to the number of invalid physical TUs included in the source block, the control section reads, with respect to every INUSE TU within a fold target block, data and management information within a physical TU, and performs writing of a logical TU by specifying the read data and a logical TU number, and then erases the fold target block.

7. The memory device according to claim 1, wherein: the control section
 writes write complete state information, which enables determination as to whether or not writing is complete, into the spare area in addition to the management information, and
 determines whether or not a power supply cutoff has occurred during writing, by checking the write complete state information at startup with respect to the last written block having the latest sequential number.

8. The memory device according to claim 1, wherein: the control section
 writes information indicating whether or not the management information is correct into the spare area in addition to the management information, and
 checks whether or not a value of the management information is correct by checking, at startup, the information indicating whether or not the management information is correct.

9. The memory device according to claim 1, wherein:
if a plurality of physical TUs having the same logical TU number exist upon scanning the management information in the spare area of the non-volatile memory, the control section determines the most recently written physical TU as INUSE, and determines other physical TUs as INVALID.

10. The memory device according to claim 9, wherein the control section determines whether physical TUs are new or old by a size comparison of sequential numbers if the physical TUs are present in different blocks, and on the basis of physical TU numbers if the physical TUs are present within the same block.

11. A memory management method for a memory device having a volatile memory and a non-volatile memory which allows data to be written, read, and erased electrically and in which writing and reading are done in units of a page and erasing is done in units of a block including a plurality of pages, a physical translation unit (TU) in the non-volatile memory including a data area and a spare area, comprising:
 performing logical address-physical address translation (logical-physical translation) in TUs each being a fraction of a size of the block and a multiple of a page size;
 managing access to the non-volatile memory in accordance with a result of the logical-physical translation;
 writing management information including a corresponding logical TU number, and a sequential number indicating the write order of each block, into the spare area of the non-volatile memory,
 building a logical-physical translation table at startup by scanning the management information in the spare area of the non-volatile memory, and stores the logical-physical translation table into the volatile memory, and performing a logical-physical translation process based on the logical-physical translation table on the volatile memory, restoring, at the startup, a physical TU state map for managing a physical TU, in parallel with building the logical-physical translation table by scanning the management information in the spare area of the non-volatile memory; and wherein the physical TU state map indicating whether the physical TU is in an unwritten, CLEAN state after an erase operation, an INUSE state in which valid data referenced from the logical-physical translation table is stored, or an INVALID state in which invalid data not referenced from the logical-physical translation table is stored.

12. A non-transitory program recording medium having a control program recorded therein for causing a computer to execute a management process for a memory device having a volatile memory and a non-volatile memory which allows data to be written, read, and erased electrically and in which writing and reading are done in units of a page and erasing is done in units of a block including a plurality of pages, a physical translation unit (TU) in the non-volatile memory including a data area and a spare area, the management process including:

performing logical address-physical address translation (logical-physical translation) in TUs corresponding to a fraction of a size of the block and a multiple of a page size;

managing access to the non-volatile memory in accordance with a result of the logical-physical translation;

writing management information including a corresponding logical TU number, and a sequential number indicating the write order of each block, into the spare area of the non-volatile memory, building a logical-physical translation table at startup by scanning the management information in the spare area of the non-volatile memory, and stores the logical-physical translation table into the volatile memory, and performing a logical-physical translation process based on the logical-physical translation table on the volatile memory, restoring, at the startup, a physical TU state map for managing a physical TU, in parallel with building the logical-physical translation table by scanning the management information in the spare area of the non-volatile memory; and wherein the physical TU state map indicating whether the physical TU is in an unwritten, CLEAN state after an erase operation, an INUSE state in which valid data referenced from the logical-physical translation table is stored, or an INVALID state in which invalid data not referenced from the logical-physical translation table is stored.

* * * * *